(12) United States Patent
Lin et al.

(10) Patent No.: US 10,698,233 B2
(45) Date of Patent: Jun. 30, 2020

(54) CONTACT LENS

(71) Applicant: LARGAN MEDICAL CO., LTD., Taichung (TW)

(72) Inventors: En-Ping Lin, Taichung (TW); Wei-Yuan Chen, Taichung (TW); Chun-Hung Teng, Taichung (TW)

(73) Assignee: LARGAN MEDICAL CO., LTD., Taichung (TW)

( * ) Notice: Subject to any disclaimer, the term of this patent is extended or adjusted under 35 U.S.C. 154(b) by 0 days.

(21) Appl. No.: 15/376,859

(22) Filed: Dec. 13, 2016

(65) Prior Publication Data

US 2017/0192251 A1 Jul. 6, 2017

(30) Foreign Application Priority Data

Dec. 31, 2015 (TW) .............................. 104144709 A

(51) Int. Cl.
*G02C 7/04* (2006.01)
*G02B 1/04* (2006.01)
*C08F 220/10* (2006.01)
*C08F 230/08* (2006.01)
*C08F 220/20* (2006.01)
*C08K 5/053* (2006.01)

(52) U.S. Cl.
CPC ............ *G02C 7/047* (2013.01); *C08F 220/10* (2013.01); *C08F 220/20* (2013.01); *C08F 230/08* (2013.01); *C08K 5/053* (2013.01); *G02B 1/043* (2013.01); *G02C 7/044* (2013.01); *G02C 7/049* (2013.01); *G02B 1/041* (2013.01)

(58) Field of Classification Search
CPC .......... G02C 7/047; G02C 7/04; G02C 7/049; G02C 2202/24; G02C 7/048; G02C 7/041; G02C 7/044; G02C 2202/04; G02C 7/045; G02C 7/042; G02C 7/028; G02C 2202/06; G02C 7/024; G02C 7/027; G02C 7/06; G02C 2202/16; G02C 2202/20
See application file for complete search history.

(56) References Cited

U.S. PATENT DOCUMENTS 6,420,453 B1 * 7/2002 Bowers ................... C07F 9/091
523/106
7,249,848 B2 7/2007 Laredo et al.
(Continued)

FOREIGN PATENT DOCUMENTS

TW I383190 B 1/2013
TW 201422263 A 6/2014

*Primary Examiner* — Thomas K Pham
*Assistant Examiner* — Sharrief I Broome
(74) *Attorney, Agent, or Firm* — McClure, Qualey & Rodack, LLP

(57) ABSTRACT

A contact lens includes, in order from a center to a periphery, an optical zone and at least two structural zones. The optical zone includes a front surface and a back surface, wherein at least one of the front surface and the back surface is aspheric, and the optical zone provides a positive force or a negative force. The structural zones concentrically surround the optical zone, wherein one of the structural zones provides a positive force, and the other of the structural zones provides a negative force. A composition for manufacturing the contact lens includes at least two kinds of monomers, at least one kind of crosslinking agent, at least one kind of diluent and at least one kind of initiator.

18 Claims, 15 Drawing Sheets

(56) References Cited

U.S. PATENT DOCUMENTS

| | | |
|---|---|---|
| 8,864,307 B2 | 10/2014 | Tung |
| 2002/0186344 A1* | 12/2002 | Tung .................. A61F 9/0017 |
| | | 351/159.23 |
| 2004/0257524 A1 | 12/2004 | Tung |
| 2005/0105046 A1 | 5/2005 | Tung |
| 2006/0072069 A1 | 4/2006 | Laredo et al. |
| 2006/0132707 A1 | 6/2006 | Tung |
| 2008/0275156 A1 | 11/2008 | Laredo et al. |
| 2009/0303434 A1 | 12/2009 | Tung |
| 2013/0314665 A1* | 11/2013 | Tung .................. G02C 7/047 |
| | | 351/159.37 |
| 2014/0036225 A1* | 2/2014 | Chehab .............. A61K 31/46 |
| | | 351/159.02 |
| 2017/0075138 A1* | 3/2017 | Lin ...................... G02C 7/041 |

\* cited by examiner

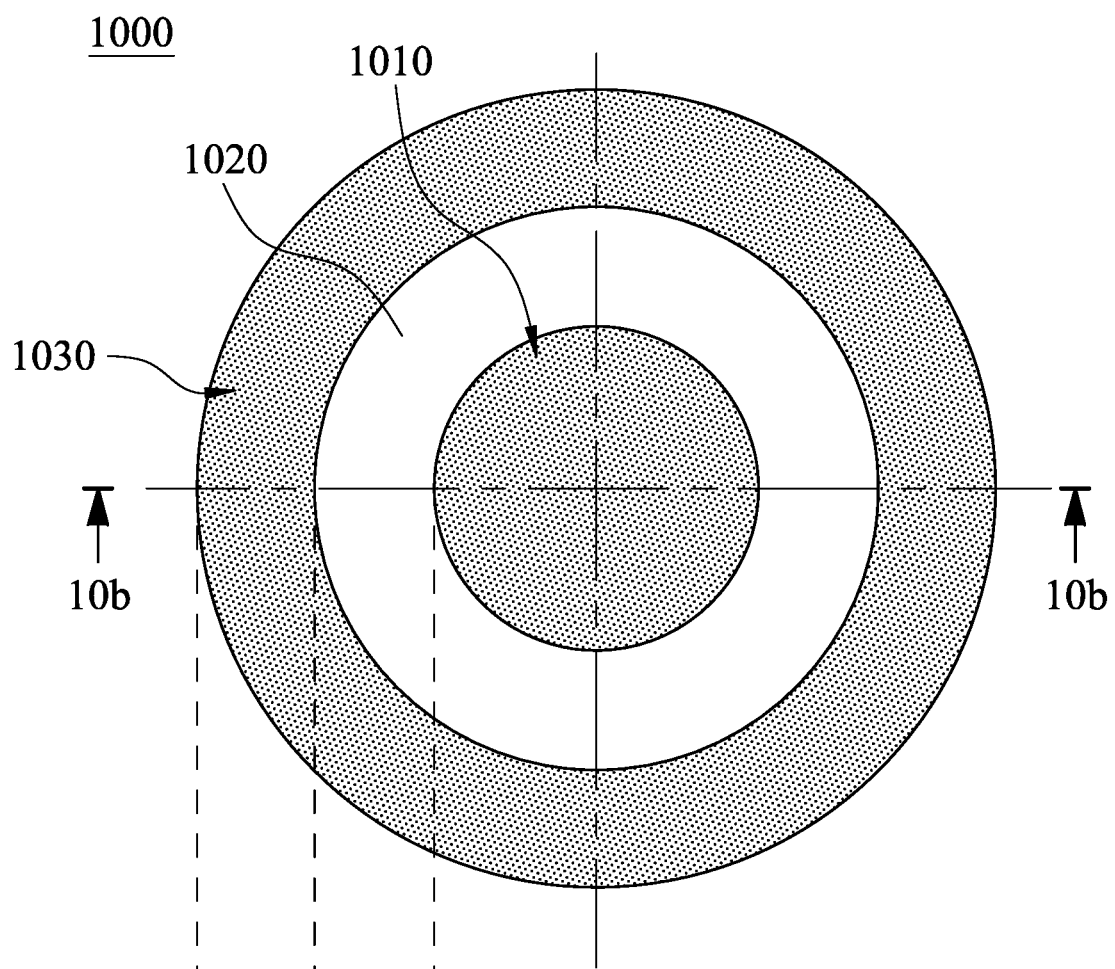
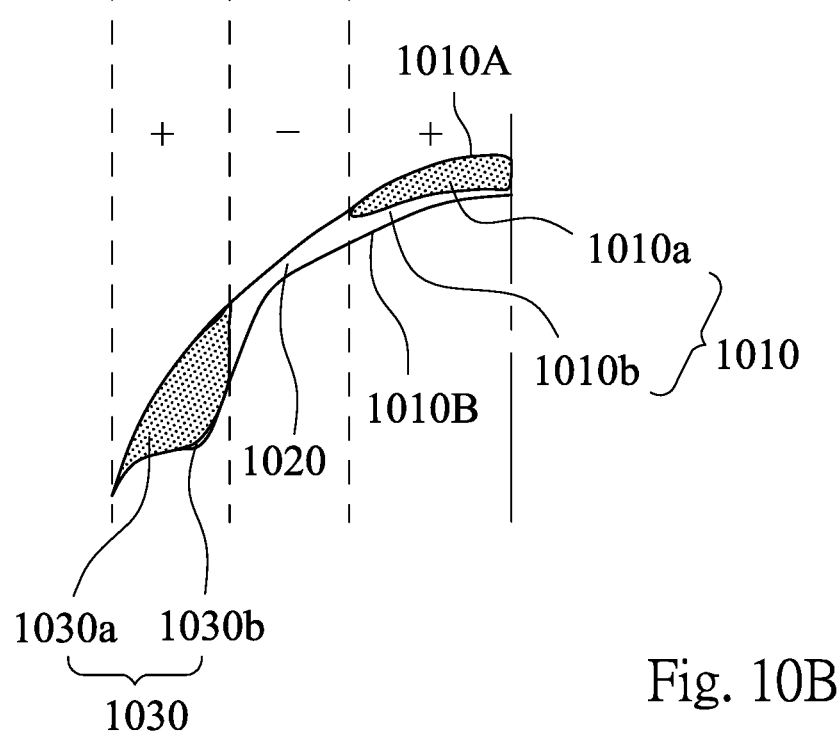
Fig. 10A
Fig. 10B

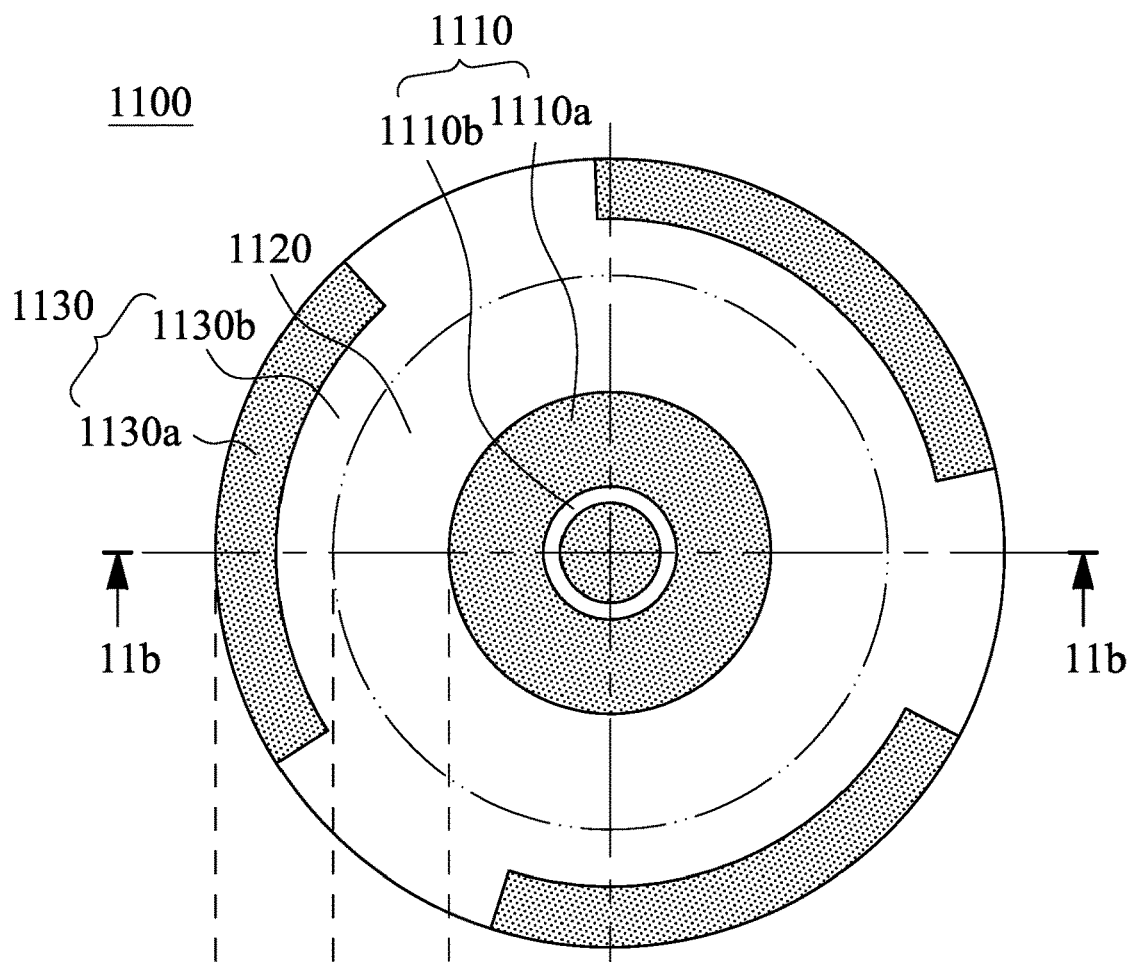
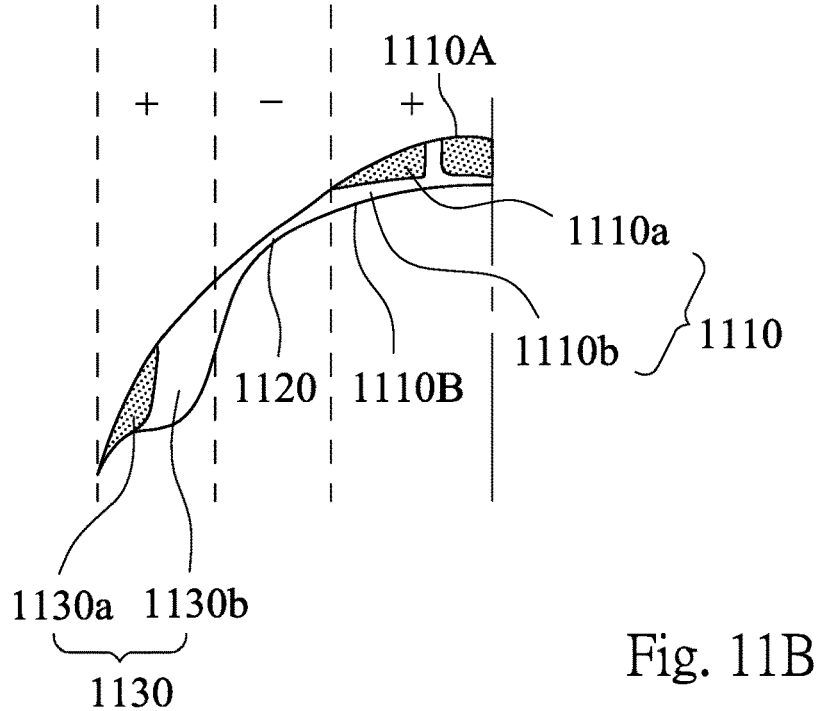
Fig. 11A
Fig. 11B

CONTACT LENS

RELATED APPLICATIONS

This application claims priority to Taiwan Application Serial Number 104144709, filed Dec. 31, 2015, which is herein incorporated by reference.

BACKGROUND

Technical Field

The present disclosure relates to a contact lens. More particularly, the present disclosure relates to a contact lens which can correct and moderate a corneal distortion.

Description of Related Art

Eyes are the window of soul. However, due to the innate defects or improper uses, the proportion of people with abnormal vision is gradually increasing. Common vision problems include myopia, hyperopia or astigmatism. People with myopia has a cornea with a stronger refractive power, so that the image is focused before the retina. In contrary, people with hyperopia has a cornea with a weaker refractive power, so that the image is focused behind the retina. People with astigmatism has unequal radian in different regions of the cornea surface or has an uneven cornea surface, so that lights cannot be accurately focused on the retina so as to form a clear image.

The aforementioned vision problems result in a blurred vision. When the vision problems are mild, which may affect the lifestyle or cause inconvenience. However, when the vision problems get worse, which may result in serious pathological changes, such as macular degeneration and retinal detachment, and increase the risk of blindness. Accordingly, how to correct and moderate the corneal distortion so as to correct vision has become the public concern.

Hard contact lens is a developed correction technique. However, the wear comfort of the hard contact lens is poor, which is not favorable for long-term wearing, and the correct effect is limited thereby. Therefore, how to improve the structure and/or the material of the contact lens, which can enhance the acceptance of the patient for long-term correction, has become the goal of the relevant industry and academics.

SUMMARY

According to one aspect of the present disclosure, a contact lens includes, in order from a center to a periphery, an optical zone and at least two structural zones. The optical zone includes a front surface and a back surface, wherein at least one of the front surface and the back surface is aspheric, and the optical zone provides a positive force or a negative force. The structural zones surround the optical zone, wherein one of the structural zones provides a positive force, and the other of the structural zones provides a negative force.

A composition for manufacturing the contact lens includes at least two kinds of monomers, at least one kind of crosslinking agent, at least one kind of diluent and at least one kind of initiator.

BRIEF DESCRIPTION OF THE DRAWINGS

The present disclosure can be more fully understood by reading the following detailed description of the embodiments, with reference made to the accompanying drawings as follows:

FIG. 10A is a schematic view of a contact lens according to the 7th example of the present disclosure;

FIG. 10B is a partial cross-sectional view taken along line 10b-10b of the contact lens shown in FIG. 10A;

FIG. 11A is a schematic view of a contact lens according to the 8th example of the present disclosure; and FIG. 11B is a partial cross-sectional view taken along line 11b-11b of the contact lens shown in FIG. 11A.

DETAILED DESCRIPTION

Figure 1A:
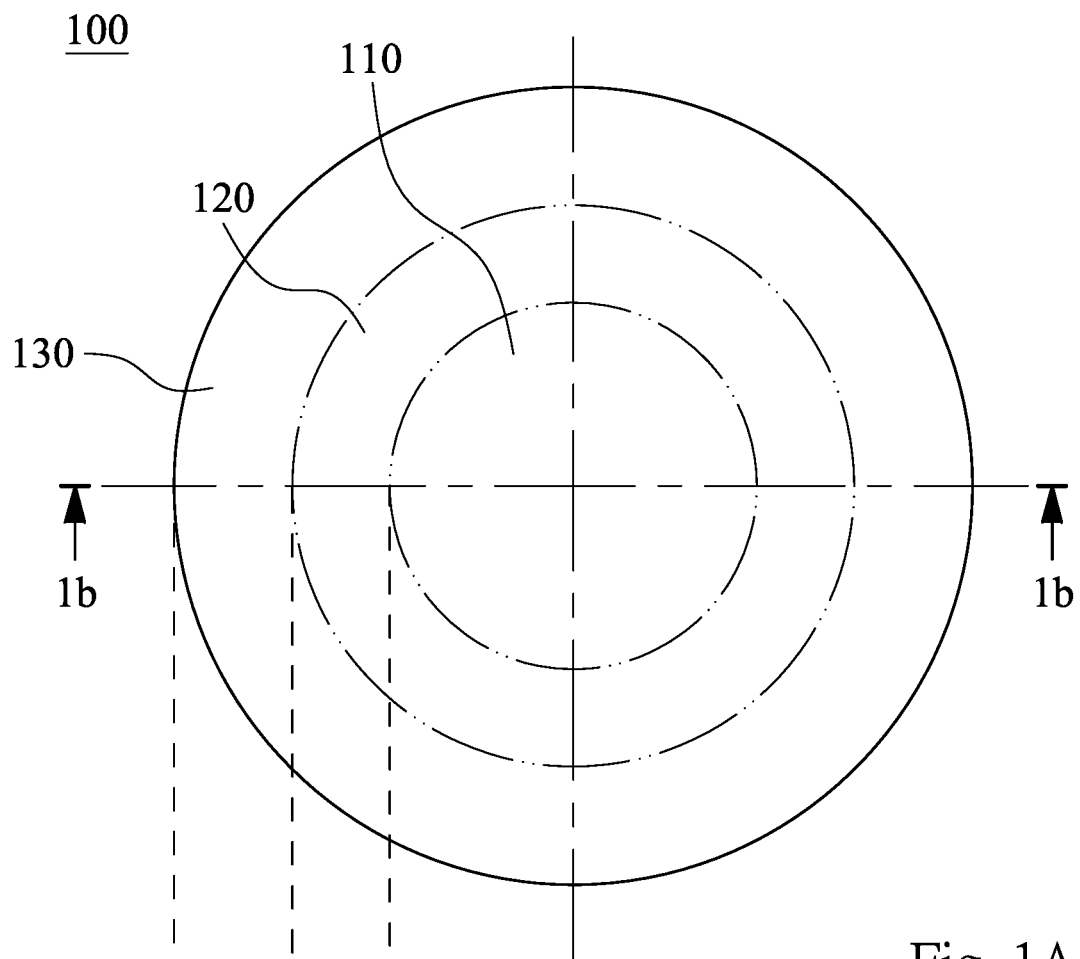
FIG. 1A is a schematic view of a contact lens according to one embodiment of the present disclosure.
Figure 1B:
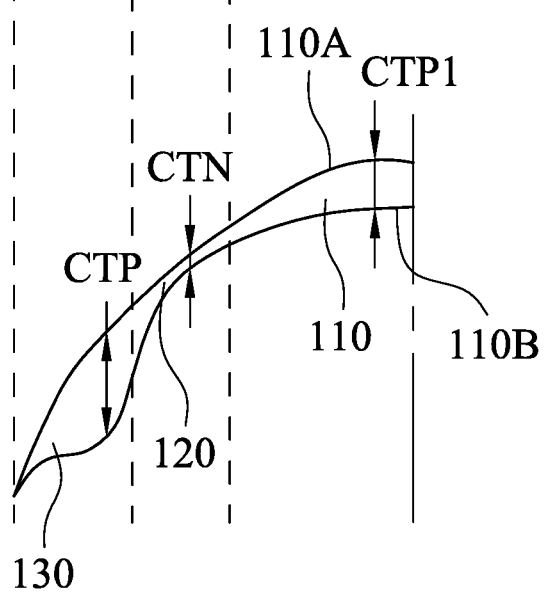
FIG. 1B is a partial cross-sectional view taken along line 1b-1b of the contact lens shown in FIG. 1A.

FIG. 1A is a schematic view of a contact lens 100 according to one embodiment of the present disclosure. FIG. 1B is a partial cross-sectional view taken along line 1b-1b of the contact lens 100 shown in FIG. 1A. As shown in FIG. 1A and FIG. 1B, the contact lens 100 includes, in order from a center to a periphery, an optical zone 110 and two structural zones which are the first structural zone 120 and the second structural zone 130. The first structural zone 120 and the second structural zone 130 can provide support and pressure control in different directions, which can achieve the goal of correcting vision defects.

The optical zone 110 includes a front surface 110A and a back surface 110B, wherein the front surface 110A is opposite to the back surface 110B, and at least one of the front surface 110A and the back surface 110B is aspheric. A diopter of the optical zone 110 can be designed as annular symmetry, which is suitable for correcting myopia or hyperopia. Alternatively, the diopter of the optical zone 110 can be designed as non-annular symmetry, wherein the diopter of the astigmatic axis can be designed according to practical demands, which is suitable for correcting astigmatism and is favorable for correcting myopia, hyperopia and astigmatism.

The optical zone 110 provides a positive force or a negative force. The first structural zone 120 and the second structural zone 130 surround the optical zone 110, wherein one of the first structural zone 120 and the second structural zone 130 provides a positive force, and the other of the first structural zone 120 and the second structural zone 130 provides a negative force. Specifically, when the optical zone 110 provides the positive force, the first structural zone 120 provides the negative force and the second structural zone 130 provides the positive force. Alternatively, when the optical zone 110 provides the negative force, the first structural zone 120 provides the positive force and the second structural zone 130 provides the negative force. With the staggered arrangement of the positive force and negative force provided by the optical zone 110, the first structural zone 120 and the second structural zone 130, pressure control in different directions, such as pressure control towards to the interior of eyes or pressure control away from the eyes, can be provided, which can correct and moderate a corneal distortion so as to achieve the effect of vision correction.

More specifically, the first structural zone 120 and the second structural zone 130 can concentrically surround the optical zone 110. The first structural zone 120 can be perfectly circular or non-perfectly circular. Therefore, the first structural zone 120 can be customized according to the corneal defect of the wearer. The second structural zone 130 can be perfectly circular or non-perfectly circular, which is favorable to attach to the sclera of the eyeball, so that the goal of support and providing the positive force or the negative force can be achieved.

A composition for manufacturing the contact lens 100 includes at least two kinds of monomers, at least one kind of crosslinking agent, at least one kind of diluent and at least one kind of initiator. Therefore, the comfort, the durability and the stability when wearing the contact lens 100 can be increased. The composition for manufacturing the contact lens 100 is recited hereinafter.

The contact lens 100 can be manufactured by a cast molding method or a spin casting method. Therefore, it is favorable for mass production, and can reduce the cost and enhance the manufacturing efficiency.

When the structural zone (the first structural zone 120 or the second structural zone 130) provides the positive force, a maximum thickness of the structural zone (the first structural zone 120 or the second structural zone 130) providing the positive force is CTP. When the structural zone (the first structural zone 120 or the second structural zone 130) provides the negative force, a minimum thickness of the structural zone (the first structural zone 120 or the second structural zone 130) providing the negative force is CTN. When the optical zone 110 provides the positive force, a maximum thickness of the optical zone 110 providing the positive force is CTP1. When the optical zone 110 provides the negative force, a minimum thickness of the optical zone 110 providing the negative force is CTN1.

FIG. 1B exemplarily represents the parameters of CTP1, CTN and CTP. In the example, the optical zone 110 provides the positive force, the first structural zone 120 provides the negative force, and the second structural zone 130 provides the positive force. As shown in FIG. 1B, when the minimum thickness of the first structural zone 120 providing the negative force is CTN, and the maximum thickness of the second structural zone 130 providing the positive force is CTP, the following condition can be satisfied: $1.0<CTP/CTN<50$. Therefore, the distribution of the positive force and the negative force can be properly adjusted so as to enhance the correction effect. Alternatively, the following condition can be satisfied: $1.0<CTP/CTN<2.15$. Alternatively, the following condition can be satisfied: $2.3<CTP/CTN<50$. Alternatively, the following condition can be satisfied: $1.1<CTP/CTN<2.1$. Alternatively, the following condition can be satisfied: $2.5<CTP/CTN<50$.

As shown in FIG. 1B, when the maximum thickness of the optical zone 110 providing the positive force is CTP1, and the minimum thickness of the first structural zone 120 providing the negative force is CTN, the following condition can be satisfied: $1.0<CTP1/CTN<50$. Therefore, the distribution of the positive force and the negative force can be properly adjusted so as to enhance the correction effect. Alternatively, the following condition can be satisfied: $1.05<CTP1/CTN<50$.

In other example, the optical zone 110 can provide the negative force, the first structural zone 120 can provide the positive force, and the second structural zone 130 can provide the negative force. When the maximum thickness of the first structural zone 120 providing the positive force is CTP, and the minimum thickness of the second structural zone 130 providing the negative force is CTN, the following condition can be satisfied: $1.0<CTP/CTN<50$. Therefore, the distribution of the positive force and the negative force can be properly adjusted so as to enhance the correction effect. Alternatively, the following condition can be satisfied: $1.0<CTP/CTN<2.15$. Alternatively, the following condition can be satisfied: $2.3<CTP/CTN<50$. Alternatively, the following condition can be satisfied: $1.1<CTP/CTN<2.1$. Alternatively, the following condition can be satisfied: $2.5<CTP/CTN<50$.

Moreover, in the aforementioned embodiment, when the minimum thickness of the optical zone 110 providing the negative force is CTN1 (not shown), and the maximum thickness of the first structural zone 120 providing the positive force is CTP, the following condition can be satisfied: $1.0<CTP/CTN1<50$. Therefore, the distribution of the positive force and the negative force can be properly adjusted so as to enhance the correction effect. Alternatively, the following condition can be satisfied: $4.0<CTP/CTN1<50$.

The thickness defined in each of CTP1, CTN1, CTP and CTN can be the thickness of the contact lens 100 in dry state or in hydrated state. Furthermore, the thickness defined in each of CTP1, CTN1, CTP and CTN is measured along a direction parallel to the central axis of the contact lens 100 (as shown in FIG. 1B). Moreover, CTN1 is greater than or equal to 0.02 mm, and CTN is greater than or equal to 0.02 mm.

Figure 2A:
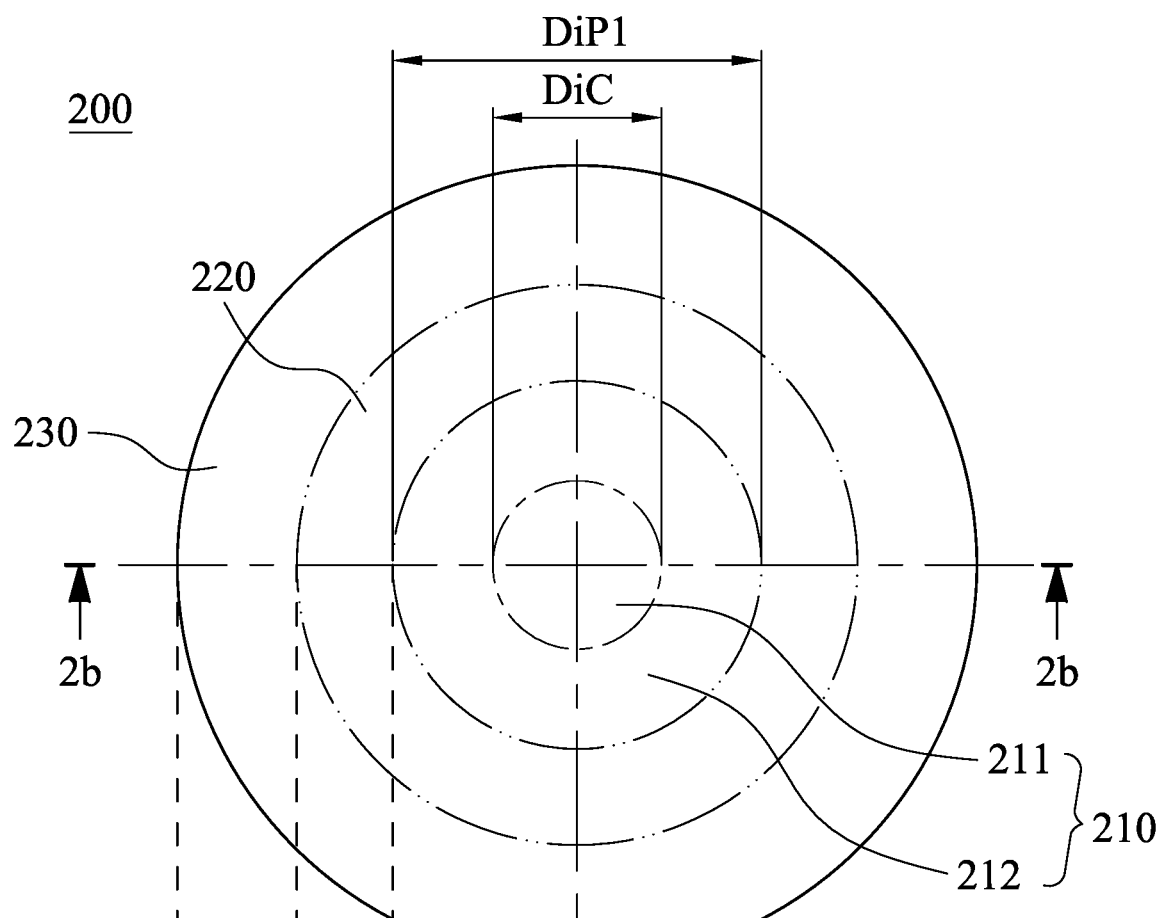
FIG. 2A is a schematic view of a contact lens according to another embodiment of the present disclosure.
Figure 2B:
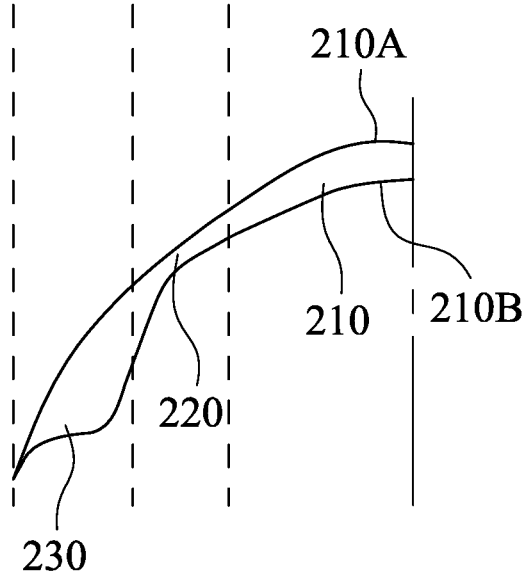
FIG. 2B is a partial cross-sectional view taken along line 2b-2b of the contact lens shown in FIG. 2A.

FIG. 2A is a schematic view of a contact lens 200 according to another embodiment of the present disclosure. FIG. 2B is a partial cross-sectional view taken along line 2b-2b of the contact lens 200 shown in FIG. 2A. As shown in FIG. 2A and FIG. 2B, the contact lens 200 includes, in order from a center to a periphery, an optical zone 210 and two structural zones which are the first structural zone 220 and the second structural zone 230. The optical zone 210 includes a front surface 210A and a back surface 210B, wherein the front surface 210A is opposite to the back surface 210B, and at least one of the front surface 210A and the back surface 210B is aspheric.

The optical zone 210 includes, in order from the center to the periphery, an optical central region 211 and a first optical annular region 212. The first optical annular region 212 surrounds the optical central region 211, wherein a diopter of the optical central region 211 is different from a diopter of the first optical annular region 212, so that the optical zone 210 is multifocal. The diopter of the optical central region 211 and the diopter of the first optical annular region 212 can be designed as annular symmetry, which is suitable for correcting myopia or hyperopia. Alternatively, the diopter of the optical central region 211 and the diopter of the first optical annular region 212 can be designed as non-annular symmetry, wherein the diopter of the astigmatic axis can be designed according to practical demands and thus suitable for correcting astigmatism. Therefore, the contact lens 200 is featured with the multifocal function, which is favorable for correcting myopia, hyperopia and astigmatism. Moreover, the first optical annular region 212 can concentrically surround the optical central region 211.

When the diopter of the optical central region 211 is PowC, and a maximum diopter of the first optical annular region 212 is PowP1, the following condition can be satisfied: |PowC−PowP1|<5D. Therefore, the increase degree of the diopter is proper, which can enhance the effect and the intensity of visual correction, and when the increase degree is moderate, the wear discomfort can be reduced. Preferably, the following condition can be satisfied: |PowC−PowP1|≤4D. More preferably, the following condition can be satisfied: |PowC−PowP1|≤3D. More preferably, the following condition can be satisfied: |PowC−PowP1|≤2D.

When a diameter of the optical central region 211 is DiC, the following condition can be satisfied: 0 mm<DiC≤5 mm. Therefore, the diameter can be flexibly adjusted according to the pupil size of different physiological states, so that the accuracy for correcting vision defects provided by the optical central region 211 can be enhanced, and the sight can be completely and clearly focused on retina. Preferably, the following condition can be satisfied: 0.5 mm≤DiC≤4 mm.

When an outer diameter of the first optical annular region 212 is DiP1, the following condition can be satisfied: 4 mm≤DiP1≤12 mm. Therefore, the increasing change rate or the decreasing change rate of the diopter desired by a multifocal contact lens can be properly adjusted, and side effects, such as dizziness, caused by the rapid change of the diopter can be avoided. Preferably, the following condition can be satisfied: 4≤mm DiP1≤8 mm.

When the diameter of the optical central region 211 is DiC, and the outer diameter of the first optical annular region 212 is DiP1, the following condition can be satisfied: 0.15≤DiC/DiP1<1. Therefore, the value of DiC/DiP1 can be properly adjusted according to the physiological state of individual eyeball, so that the contact lens 200 with a proper change of the diopter can be obtained. Accordingly, it is favorable to precisely correct the vision defects. Preferably, the following condition can be satisfied: 0.25≤DiC/DiP1<0.8.

The other properties of the contact lens 200 can be the same as that of the contact lens 100 in FIG. 1A, and will not be repeated herein.

Figure 3A:
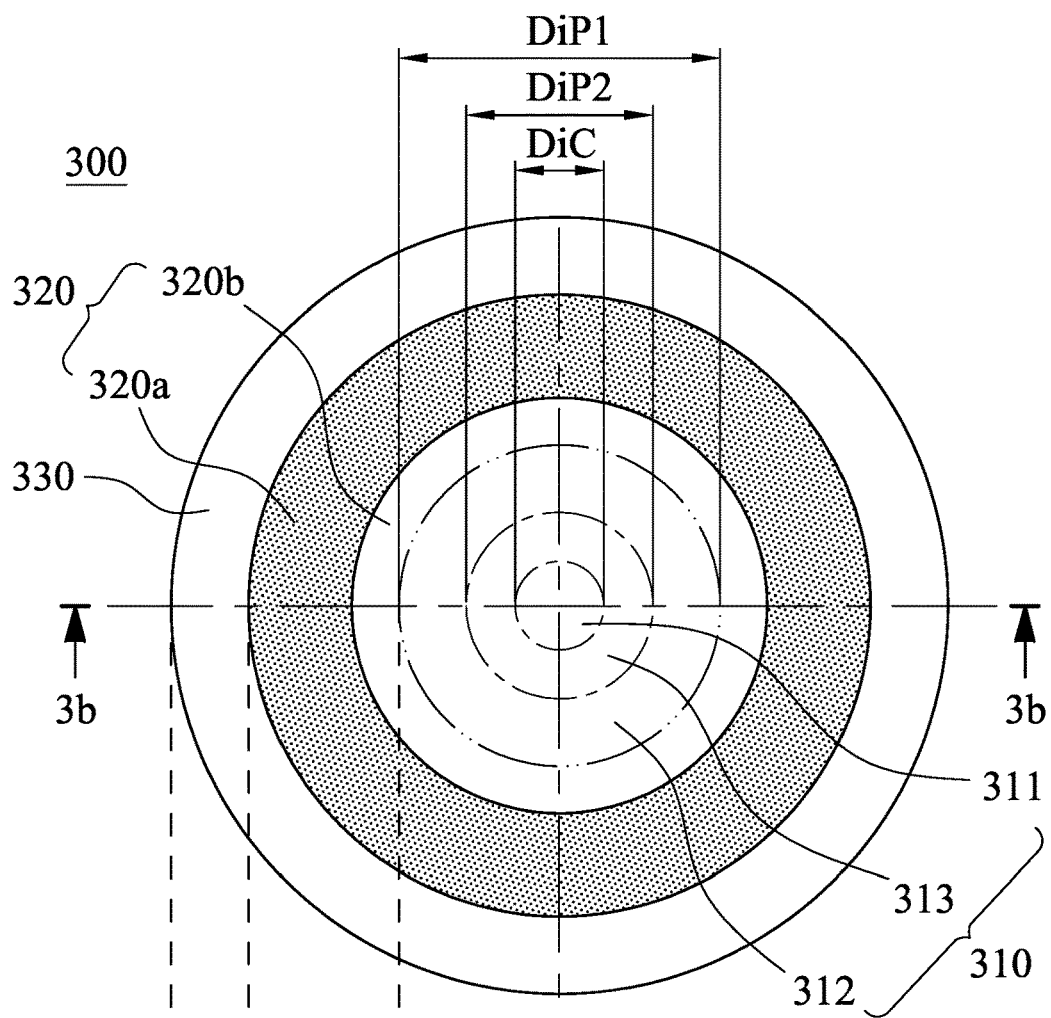
FIG. 3A is a schematic view of a contact lens according to yet another embodiment of the present disclosure.
Figure 3B:
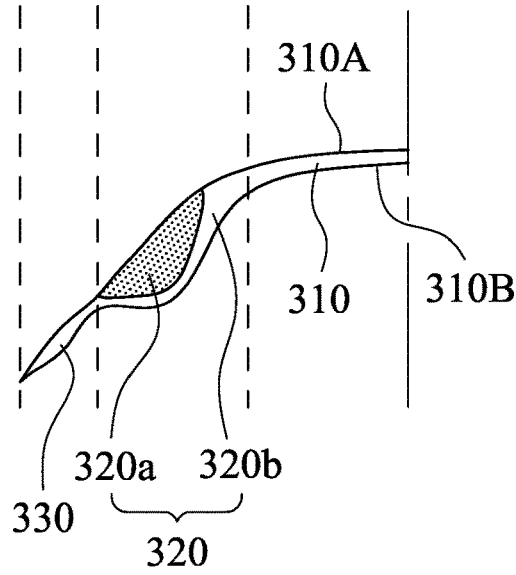
FIG. 3B is a partial cross-sectional view taken along line 3b-3b of the contact lens shown in FIG. 3A.

FIG. 3A is a schematic view of a contact lens 300 according to yet another embodiment of the present disclosure. FIG. 3B is a partial cross-sectional view taken along line 3b-3b of the contact lens 300 shown in FIG. 3A. As shown in FIG. 3A and FIG. 3B, the contact lens 300 includes, in order from a center to a periphery, an optical zone 310 and two structural zones which are the first structural zone 320 and the second structural zone 330. The optical zone 310 includes a front surface 310A and a back surface 310B, wherein the front surface 310A is opposite to the back surface 310B, and at least one of the front surface 310A and the back surface 310B is aspheric.

The optical zone 310 includes, in order from the center to the periphery, an optical central region 311, a second optical annular region 313 and a first optical annular region 312. The first optical annular region 312 and the second optical annular region 313 surround the optical central region 311, wherein a diopter of the optical central region 311 is different from a diopter of the first optical annular region 312, and the diopter of the first optical annular region 312 is different from a diopter of the second optical annular region 313, so that the optical zone 310 is multifocal. The diopter of the optical central region 311, the diopter of the first optical annular region 312 and the diopter of the second optical annular region 313 can be designed as annular symmetry, which is suitable for correcting myopia or hyperopia. Alternatively, the diopter of the optical central region 311, the diopter of the first optical annular region 312 and the diopter of the second optical annular region 313 can be designed as non-annular symmetry, wherein the diopter of the astigmatic axis can be designed according to practical demands and thus suitable for correcting astigmatism. Therefore, the contact lens 300 is featured with the multifocal function, which is favorable for correcting myopia, hyperopia and astigmatism. In the embodiment, a number of the optical annular regions (the first optical annular region 312 and the second optical annular region 313) is two. In other embodiment, the number of the optical annular regions can be adjusted according the required number of the focal points. Moreover, the first optical annular region 312 and the second optical annular region 313 can concentrically surround the optical central region 311.

When an outer diameter of the second optical annular region 313 is DiP2, the following condition can be satisfied: 3.5≤mm DiP2≤10 mm. Therefore, the change rate of the diopter can be effectively moderated. Preferably, the following condition can be satisfied: 3.5≤mm DiP2≤7 mm.

When a diameter of the optical central region 311 is DiC, and the outer diameter of the second optical annular region 313 is DiP2, the following condition can be satisfied: 0.2≤DiC/DiP2<1. Therefore, the change rate of the diopter of the second optical annular region 313 can be effectively moderated, and the discomfort caused by the rapid change of the diopter can be avoided. Preferably, the following condition can be satisfied: 0.25≤DiC/DiP2<0.8.

The contact lens 300 includes a first material and a second material. Specifically, a first portion 320a of the first structural zone 320 is made of the first material, and the optical zone 310, the second portion 320b of the first structural zone 320 and the second structural zone 330 is made of the second material. Therefore, the ability for controlling the positive force and the negative force can be enhanced.

When a Young's modulus of the first material is HMPa, and a Young's modulus of the second material is LMPa, the following condition can be satisfied: HMPa/LMPa>2. Therefore, the hardness of the contact lens 300 can be controlled, and a better wear comfort and correction effect can be provided. Moreover, the durability of the contact lens 300 can be enhanced, so that the split and the damage of the contact lens 300 can be avoided. Preferably, the following condition can be satisfied: HMPa/LMPa>1.5. More preferably, the following condition can be satisfied: HMPa/LMPa>1.3.

The zone providing the positive force of the contact lens 300 can include at least two materials. That is, the zone providing the positive force of the contact lens 300 can include the first material and the second material, and can selectively include other materials. For example, when the optical zone 310, provides the negative force, the first structural zone 320 provides the positive force, and the second structural zone 330 provides the negative force, the first structural zone 320 providing the positive force includes the first material (i.e., the first portion 320a) and the second material (i.e., the second portion 320b). Therefore, the pushing force toward to the eyeball providing by the zone with the positive force can be intensified, and the pulling force away from the eyeball providing by the zone with the negative force can also be intensified. Accordingly, the correction effect can be improved.

The other properties of the contact lens 300 can be the same as that of the contact lens 100 in FIG. 1A and that of the contact lens 200 in FIG. 2A, and will not be repeated herein.

Composition for Manufacturing Contact Lens

A composition for manufacturing the contact lens includes at least two kinds of monomers, at least one kind of crosslinking agent, at least one kind of diluent and at least one kind of initiator, and selectively includes an ultraviolet (UV) blocking agent or a blue-light blocking agent. Therefore, the species and content of each of the ingredients of the composition can be adjusted, which is favorable for adjusting the Young's modulus and the softness of the contact lens so as to enhance the durability and the stability. Furthermore, the water content of the contact lens can be properly adjusted, so that the comfort and the oxygen permeability can be improved.

The composition for manufacturing the contact lens can include at least four kinds of monomers, at least two kinds of crosslinking agent, at least two kinds of diluent and at least one kind of initiator, and selectively includes an UV blocking agent or a blue-light blocking agent. Therefore, the contact lens having a first material and a second material can be manufactured, which is favorable for enhancing the regulation function of structural zones for regulating the positive force or the negative force. Accordingly, the effect for correcting the vision defects can be improved.

The monomer can be but is not limited to 2-hydroxyethyl methacrylate, glycerol monomethacrylate, methacrylic acid, 3-methacryloyloxypropyltris(trimethylsilyloxy)silane, N-vinyl-2-pyrrolidinone, N,N-dimethyl acrylamide, 3-(3-methacryloxy-2-hydroxypropoxy)propylbis(trimethylsiloxy) methylsilane or (3-acryloxy-2-hydroxypropoxypropyl) terminated polydimethylsiloxane. Therefore, the proper species of the monomer can be selected, which is favorable for balancing properties, such as the durability, stability, comfort and oxygen permeability, of the contact lens.

The contact lens can be made of hydrogel. Therefore, the moisture, smoothness and softness of the contact lens can be maintained, and is capable of long wear. Furthermore, the foreign body sensation can be avoided when wearing the contact lens.

When the contact lens is made of hydrogel, the monomer can be 2-hydroxyethyl methacrylate, glycerol monomethacrylate or methacrylic acid. Based on 100 parts by weight (100 wt %) of the composition, a content of 2-hydroxyethyl methacrylate can be 10 wt % to 96 wt %, a content of glycerol monomethacrylate can be 5 wt % to 60 wt %, and a content of methacrylic acid can be 0.01 wt % to 5 wt %. Therefore, the water content and the softness of the contact lens can be effectively increased. Preferably, based on 100 wt % of the composition, the content of 2-hydroxyethyl methacrylate can be 40 wt % to 96 wt %, the content of glycerol monomethacrylate can be 20 wt % to 50 wt %, and the content of methacrylic acid can be 0.1 wt % to 2 wt %.

The contact lens can be made of silicone hydrogel. Therefore, the oxygen permeability of the contact lens can be enhanced, and the phenomena, such as red eyes, bloodshot eyes and swell, caused by the hypoxia of cornea can be prevented. Accordingly, the long wear comfort can be provided. When the contact lens is made of silicone hydrogel, the monomer can be 3-methacryloyloxypropyltris(trimethylsilyloxy)silane, N-vinyl-2-pyrrolidinone, N,N-dimethyl acrylamide, 2-hydroxyethyl methacrylate, 3-(3-methacryloxy-2-hydroxypropoxy)propylbis(trimethylsiloxy)methylsilane, (3-acryloxy-2-hydroxypropoxypropyl)terminated polydimethylsiloxane or methacrylic acid. Based on 100 wt % of the composition, a content of 3-methacryloyloxypropyltris(trimethylsilyloxy)silane can be 0.1 wt % to 40 wt %, a content of N-vinyl-2-pyrrolidinone can be 0.1 wt % to 35 wt %, a content of N,N-dimethyl acrylamide can be 0.1 wt % to 40 wt %, a content of 2-hydroxyethyl methacrylate can be 0.05 wt % to 25 wt %, a content of 3-(3-methacryloxy-2-hydroxypropoxy)propylbis(trimethylsiloxy)methylsilane can be 0.1 wt % to 30 wt %, a content of (3-acryloxy-2-hydroxypropoxypropyl)terminated polydimethylsiloxane can be 0.1 wt % to 40 wt %, and a content of methacrylic acid can be 0.01 wt % to 5 wt %. Therefore, the oxygen permeability and the hardness of the contact lens can be effectively increased. Preferably, based on 100 wt % of the composition, the content of 3-methacryloyloxypropyltris (trimethylsilyloxy)silane can be 1 wt % to 40 wt %, the content of N-vinyl-2-pyrrolidinone can be 1 wt % to 35 wt %, the content of N,N-dimethyl acrylamide can be 1 wt % to 20 wt %, the content of 2-hydroxyethyl methacrylate can be 0.1 wt % to 10 wt %, the content of 3-(3-methacryloxy-2-hydroxypropoxy)propylbis(trimethylsiloxy)methylsilane can be 1 wt % to 30 wt %, the content of (3-acryloxy-2-hydroxypropoxypropyl)terminated polydimethylsiloxane can be 1 wt % to 40 wt %, and the content of methacrylic acid can be 0.1 wt % to 2 wt %.

The crosslinking agent can be but is not limited to ethylene glycol dimethacrylate or 1,1,1-trimethylol propane trimethacrylate. Based on 100 wt % of the composition, a content of the crosslinking agent can be 0.01 wt % to 5 wt %. Preferably, based on 100 wt % of the composition, the content of the crosslinking agent can be 0.1 wt % to 2 wt %. Therefore, the monomers can be preferably crosslinked, so that the stability and durability of the contact lens can be enhanced.

The diluent can be but is not limited to polyethylene glycol 300, polyethylene glycol 600, polyethylene glycol 800, polyethylene glycol 1000, polyethylene glycol 2000, polyethylene glycol 4000, 1,4-butanediol, ethanol, isopropyl alcohol, glycerol or 1-hexanol. Based on 100 wt % of the composition, a content of the diluent can be 0.1 wt % to 30 wt %. Therefore, it can auxiliary adjust the Young's modulus of the contact lens so as to enhance the wear comfort of the contact lens. Preferably, based on 100 wt % of the composition, the content of the diluent can be 1 wt % to 20 wt %.

The initiator can be but is not limited to 2-hydroxy-2-methyl-propiophenone. Based on 100 wt % of the composition, a content of the initiator can be 0.01 wt % to 5 wt %. Therefore, it allows the composition of the contact lens to undergo a polymerization reaction with high efficiency. Preferably, based on 100 wt % of the composition, the content of the initiator can be 0.1 wt % to 2 wt %.

The UV blocking agent can be but is not limited to 2-[3-(2H-benzotriazol-2-yl)-4-hydroxyphenyl]ethyl methacrylate, 4-methacryloxy-2-hydroxybenzophenone, 2-phenylethyl acrylate, 2-phenylethyl methacrylate, 2-(2'-hydroxy-5'-methacryloxyethylphenyl)-2H-benzotriazole or 2-(4-benzoyl-3-hydroxyphenoxy)ethyl acrylate. Therefore, the contact lens can block high-energy UV lights, and the probability that the retina hurt by the UV lights can be reduced. Based on 100 wt % of the composition, a content of the UV blocking agent can be 0.01 wt % to 10 wt %. Preferably, based on 100 wt % of the composition, the content of the UV blocking agent can be 0.1 wt % to 5 wt %.

The blue-light blocking agent can be but is not limited to 4-(phenyldiazenyl)phenyl methacrylate. Therefore, the contact lens can block high-energy blue lights, and the probability that the retina hurt by the blue lights can be reduced. Based on 100 wt % of the composition, a content of the blue-light blocking agent can be 0.01 wt % to 10 wt %. Preferably, based on 100 wt % of the composition, the content of the blue-light blocking agent can be 0.1 wt % to 5 wt %.

According to the above description of the present disclosure, the following 1st-32nd specific formulation examples for manufacturing the contact lens are provided for further explanation.

1st Formulation Example

A composition of the 1st formulation example and a water content and Young's modulus of the material manufactured by the 1st formulation example are listed in Table 1. Specifically, a contact lens whose material is hydrogel can be manufactured by the 1st formulation example.

TABLE 1

| Function | Ingredient | Content (wt %) |
|---|---|---|
| monomer | 2-hydroxyethyl methacrylate | 80 |
| monomer | methacrylic acid | 1.5 |
| crosslinking agent | ethylene glycol dimethacrylate | 1 |
| crosslinking agent | 1,1,1-trimethylol propane trimethacrylate | 0.5 |
| diluent | 1,4-butanediol | 15 |
| initiator | 2-hydroxy-2-methyl-propiophenone | 0.5 |
| UV blocking agent | 2-(2'-hydroxy-5-methacryloxyethylphenyl)-2H-benzotriazole | 1.5 |

Note:
the material manufactured by the 1st formulation example is hydrogel, the water content thereof is 55 ± 2 wt %, and the Young's modulus thereof is 0.2 ± 0.05 Mpa.

2nd Formulation Example

A composition of the 2nd formulation example and a water content and Young's modulus of the material manufactured by the 2nd formulation example are listed in Table 2. Specifically, a contact lens whose material is hydrogel can be manufactured by the 2nd formulation example.

TABLE 2

| Function | Ingredient | Content (wt %) |
|---|---|---|
| monomer | 2-hydroxyethyl methacrylate | 43 |
| monomer | glycerol monomethacrylate | 38.5 |
| crosslinking agent | ethylene glycol dimethacrylate | 1 |
| crosslinking agent | 1,1,1-trimethylol propane trimethacrylate | 0.5 |
| diluent | 1,4-butanediol | 15 |
| initiator | 2-hydroxy-2-methyl-propiophenone | 0.5 |
| blue-light blocking agent | 4-(phenyldiazenyl)phenyl methacrylate | 1.5 |

Note:
the material manufactured by the 2nd formulation example is hydrogel, the water content thereof is 57 ± 2 wt %, and the Young's modulus thereof is 0.2 ± 0.05 Mpa.

3rd Formulation Example

A composition of the 3rd formulation example and a water content and Young's modulus of the material manufactured by the 3rd formulation example are listed in Table 3. Specifically, a contact lens whose material is hydrogel can be manufactured by the 3rd formulation example.

TABLE 3

| Function | Ingredient | Content (wt %) |
|---|---|---|
| monomer | 2-hydroxyethyl methacrylate | 80 |
| monomer | methacrylic acid | 1 |
| crosslinking agent | ethylene glycol dimethacrylate | 1 |
| crosslinking agent | 1,1,1-trimethylol propane trimethacrylate | 0.5 |
| diluent | polyethylene glycol 600 | 15 |
| initiator | 2-hydroxy-2-methyl-propiophenone | 0.5 |
| UV blocking agent | 2-(2'-hydroxy-5'-methacryloxyethylphenyl)-2H-benzotriazole | 1 |
| blue-light blocking agent | 4-(phenyldiazenyl)phenyl methacrylate | 1 |

Note:
the material manufactured by the 3rd formulation example is hydrogel, the water content thereof is 55 ± 2 wt %, and the Young's modulus thereof is 0.2 ± 0.05 Mpa.

4th Formulation Example

A composition of the 4th formulation example and a water content and Young's modulus of the material manufactured by the 4th formulation example are listed in Table 4. Specifically, a contact lens whose material is hydrogel can be manufactured by the 4th formulation example.

TABLE 4

| Function | Ingredient | Content (wt %) |
|---|---|---|
| monomer | 2-hydroxyethyl methacrylate | 43 |
| monomer | glycerol monomethacrylate | 38.5 |
| crosslinking agent | ethylene glycol dimethacrylate | 1 |
| crosslinking agent | 1,1,1-trimethylol propane trimethacrylate | 0.5 |
| diluent | polyethylene glycol 600 | 15 |
| initiator | 2-hydroxy-2-methyl-propiophenone | 0.5 |
| UV blocking agent | 2-(2'-hydroxy-5'-methacryloxyethylphenyl)-2H-benzotriazole | 1.5 |

Note:
the material manufactured by the 4th formulation example is hydrogel, the water content thereof is 57 ± 2 wt %, and the Young's modulus thereof is 0.2 ± 0.05 Mpa.

5th Formulation Example

A composition of the 5th formulation example and a water content and Young's modulus of the material manufactured by the 5th formulation example are listed in Table 5. Specifically, a contact lens whose material is hydrogel can be manufactured by the 5th formulation example.

TABLE 5

| Function | Ingredient | Content (wt %) |
|---|---|---|
| monomer | 2-hydroxyethyl methacrylate | 80 |
| monomer | methacrylic acid | 1.5 |
| crosslinking agent | ethylene glycol dimethacrylate | 1 |
| crosslinking agent | 1,1,1-trimethylol propane trimethacrylate | 0.5 |
| diluent | polyethylene glycol 300 | 15 |
| initiator | 2-hydroxy-2-methyl-propiophenone | 0.5 |
| UV blocking agent | 2-(2'-hydroxy-5'-methacryloxyethylphenyl)-2H-benzotriazole | 1.5 |

Note:
the material manufactured by the 5th formulation example is hydrogel, the water content thereof is 55 ± 2 wt %, and the Young's modulus thereof is 0.2 ± 0.05 Mpa.

6th Formulation Example

A composition of the 6th formulation example and a water content and Young's modulus of the material manufactured by the 6th formulation example are listed in Table 6. Specifically, a contact lens whose material is hydrogel can be manufactured by the 6th formulation example.

TABLE 6

| Function | Ingredient | Content (wt %) |
|---|---|---|
| monomer | 2-hydroxyethyl methacrylate | 42 |
| monomer | glycerol monomethacrylate | 40 |
| crosslinking agent | ethylene glycol dimethacrylate | 1 |
| crosslinking agent | 1,1,1-trimethylol propane trimethacrylate | 0.5 |
| diluent | polyethylene glycol 300 | 15 |
| initiator | 2-hydroxy-2-methyl-propiophenone | 0.5 |
| blue-light blocking agent | 4-(phenyldiazenyl)phenyl methacrylate | 1 |

Note:
the material manufactured by the 6th formulation example is hydrogel, the water content thereof is 57 ± 2 wt %, and the Young's modulus thereof is 0.2 ± 0.05 Mpa.

7th Formulation Example

A composition of the 7th formulation example and a water content and Young's modulus of the material manufactured by the 7th formulation example are listed in Table 7. Specifically, a contact lens whose material is hydrogel can be manufactured by the 7th formulation example.

TABLE 7

| Function | Ingredient | Content (wt %) |
|---|---|---|
| monomer | 2-hydroxyethyl methacrylate | 80 |
| monomer | methacrylic acid | 1 |
| crosslinking agent | ethylene glycol dimethacrylate | 1 |
| crosslinking agent | 1,1,1-trimethylol propane trimethacrylate | 0.5 |
| diluent | glycerol | 15 |
| initiator | 2-hydroxy-2-methyl-propiophenone | 0.5 |
| UV blocking agent | 2-(2'-hydroxy-5'-methacryloxyethylphenyl)-2H-benzotriazole | 1 |
| blue-light blocking agent | 4-(phenyldiazenyl)phenyl methacrylate | 1 |

Note:
the material manufactured by the 7th formulation example is hydrogel, the water content thereof is 55 ± 2 wt %, and the Young's modulus thereof is 0.2 ± 0.05 Mpa.

8th Formulation Example

A composition of the 8th formulation example and a water content and Young's modulus of the material manufactured by the 8th formulation example are listed in Table 8. Specifically, a contact lens whose material is hydrogel can be manufactured by the 8th formulation example.

TABLE 8

| Function | Ingredient | Content (wt %) |
|---|---|---|
| monomer | 2-hydroxyethyl methacrylate | 41.5 |
| monomer | glycerol monomethacrylate | 40 |
| crosslinking agent | ethylene glycol dimethacrylate | 1 |
| crosslinking agent | 1,1,1-trimethylol propane trimethacrylate | 0.5 |
| diluent | glycerol | 15 |
| initiator | 2-hydroxy-2-methyl-propiophenone | 0.5 |
| UV blocking agent | 2-(2'-hydroxy-5-methacryloxyethylphenyl)-2H-benzotriazole | 1.5 |

Note:
the material manufactured by the 8th formulation example is hydrogel, the water content thereof is 57 ± 2 wt %, and the Young's modulus thereof is 0.2 ± 0.05 Mpa.

9th Formulation Example

A composition of the 9th formulation example and a water content and Young's modulus of the material manufactured by the 9th formulation example are listed in Table 9. Specifically, a contact lens whose material is hydrogel can be manufactured by the 9th formulation example.

TABLE 9

| Function | Ingredient | Content (wt %) |
|---|---|---|
| monomer | 2-hydroxyethyl methacrylate | 81.5 |
| monomer | methacrylic acid | 1.5 |
| crosslinking agent | ethylene glycol dimethacrylate | 1.5 |
| crosslinking agent | 1,1,1-trimethylol propane trimethacrylate | 1 |
| diluent | polyethylene glycol 4000 | 12.5 |
| initiator | 2-hydroxy-2-methyl-propiophenone | 0.5 |
| UV blocking agent | 2-(2'-hydroxy-5-methacryloxyethylphenyl)-2H-benzotriazole | 1.5 |

Note:
the material manufactured by the 9th formulation example is hydrogel, the water content thereof is 55 ± 2 wt %, and the Young's modulus thereof is 0.6 ± 0.05 Mpa.

10th Formulation Example

A composition of the 10th formulation example and a water content and Young's modulus of the material manufactured by the 10th formulation example are listed in Table 10. Specifically, a contact lens whose material is hydrogel can be manufactured by the 10th formulation example.

TABLE 10

| Function | Ingredient | Content (wt %) |
| --- | --- | --- |
| monomer | 2-hydroxyethyl methacrylate | 43 |
| monomer | glycerol monomethacrylate | 40 |
| crosslinking agent | ethylene glycol dimethacrylate | 1.5 |
| crosslinking agent | 1,1,1-trimethylol propane trimethacrylate | 1 |
| diluent | polyethylene glycol 4000 | 12.5 |
| initiator | 2-hydroxy-2-methyl-propiophenone | 1 |
| blue-light blocking agent | 4-(phenyldiazenyl)phenyl methacrylate | 1 |

Note:
the material manufactured by the 10th formulation example is hydrogel, the water content thereof is 57 ± 2 wt %, and the Young's modulus thereof is 0.6 ± 0.05 Mpa.

11th Formulation Example

A composition of the 11th formulation example and a water content and Young's modulus of the material manufactured by the 11th formulation example are listed in Table 11. Specifically, a contact lens whose material is hydrogel can be manufactured by the 11th formulation example.

TABLE 11

| Function | Ingredient | Content (wt %) |
| --- | --- | --- |
| monomer | 2-hydroxyethyl methacrylate | 80 |
| monomer | methacrylic acid | 1.5 |
| crosslinking agent | ethylene glycol dimethacrylate | 1.5 |
| crosslinking agent | 1,1,1-trimethylol propane trimethacrylate | 1 |
| diluent | polyethylene glycol 2000 | 12.5 |
| initiator | 2-hydroxy-2-methyl-propiophenone | 1 |
| UV blocking agent | 2-(2'-hydroxy-5'-methacryloxyethylphenyl)-2H-benzotriazole | 1.5 |
| blue-light blocking agent | 4-(phenyldiazenyl)phenyl methacrylate | 1 |

Note:
the material manufactured by the 11th formulation example is hydrogel, the water content thereof is 55 ± 2 wt %, and the Young's modulus thereof is 0.5 ± 0.05 Mpa.

12th Formulation Example

A composition of the 12th formulation example and a water content and Young's modulus of the material manufactured by the 12th formulation example are listed in Table 12. Specifically, a contact lens whose material is hydrogel can be manufactured by the 12th formulation example.

TABLE 12

| Function | Ingredient | Content (wt %) |
| --- | --- | --- |
| monomer | 2-hydroxyethyl methacrylate | 44.5 |
| monomer | glycerol monomethacrylate | 38.5 |
| crosslinking agent | ethylene glycol dimethacrylate | 1.5 |
| crosslinking agent | 1,1,1-trimethylol propane trimethacrylate | 1 |
| diluent | polyethylene glycol 2000 | 12.5 |

TABLE 12-continued

| Function | Ingredient | Content (wt %) |
| --- | --- | --- |
| initiator | 2-hydroxy-2-methyl-propiophenone | 0.5 |
| UV blocking agent | 2-(2'-hydroxy-5'-methacryloxyethylphenyl)-2H-benzotriazole | 1.5 |

Note:
the material manufactured by the 12th formulation example is hydrogel, the water content thereof is 57 ± 2 wt %, and the Young's modulus thereof is 0.5 ± 0.05 Mpa.

13th Formulation Example

A composition of the 13th formulation example and a water content and Young's modulus of the material manufactured by the 13th formulation example are listed in Table 13. Specifically, a contact lens whose material is hydrogel can be manufactured by the 13th formulation example.

TABLE 13

| Function | Ingredient | Content (wt %) |
| --- | --- | --- |
| monomer | 2-hydroxyethyl methacrylate | 81.5 |
| monomer | methacrylic acid | 1.5 |
| crosslinking agent | ethylene glycol dimethacrylate | 1.5 |
| crosslinking agent | 1,1,1-trimethylol propane trimethacrylate | 1 |
| diluent | polyethylene glycol 1000 | 12.5 |
| initiator | 2-hydroxy-2-methyl-propiophenone | 0.5 |
| UV blocking agent | 2-(2'-hydroxy-5'-methacryloxyethylphenyl)-2H-benzotriazole | 1.5 |

Note:
the material manufactured by the 13th formulation example is hydrogel, the water content thereof is 55 ± 2 wt %, and the Young's modulus thereof is 0.4 ± 0.05 Mpa.

14th Formulation Example

A composition of the 14th formulation example and a water content and Young's modulus of the material manufactured by the 14th formulation example are listed in Table 14. Specifically, a contact lens whose material is hydrogel can be manufactured by the 14th formulation example.

TABLE 14

| Function | Ingredient | Content (wt %) |
| --- | --- | --- |
| monomer | 2-hydroxyethyl methacrylate | 43 |
| monomer | glycerol monomethacrylate | 40 |
| crosslinking agent | ethylene glycol dimethacrylate | 1.5 |
| crosslinking agent | 1,1,1-trimethylol propane trimethacrylate | 1 |
| diluent | polyethylene glycol 1000 | 12.5 |
| initiator | 2-hydroxy-2-methyl-propiophenone | 1 |
| blue-light blocking agent | 4-(phenyldiazenyl)phenyl methacrylate | 1 |

Note:
the material manufactured by the 14th formulation example is hydrogel, the water content thereof is 57 ± 2 wt %, and the Young's modulus thereof is 0.4 ± 0.05 Mpa.

15th Formulation Example

A composition of the 15th formulation example and a water content and Young's modulus of the material manufactured by the 15th formulation example are listed in Table 15. Specifically, a contact lens whose material is hydrogel can be manufactured by the 15th formulation example.

TABLE 15

| Function | Ingredient | Content (wt %) |
|---|---|---|
| monomer | 2-hydroxyethyl methacrylate | 81.5 |
| monomer | methacrylic acid | 1.5 |
| crosslinking agent | ethylene glycol dimethacrylate | 1.5 |
| crosslinking agent | 1,1,1-trimethylol propane trimethacrylate | 1 |
| diluent | polyethylene glycol 800 | 12 |
| initiator | 2-hydroxy-2-methyl-propiophenone | 0.5 |
| UV blocking agent | 2-(2'-hydroxy-5'-methacryloxyethylphenyl)-2H-benzotriazole | 1.5 |
| blue-light blocking agent | 4-(phenyldiazenyl)phenyl methacrylate | 0.5 |

Note:
the material manufactured by the 15th formulation example is hydrogel, the water content thereof is 55 ± 2 wt %, and the Young's modulus thereof is 0.4 ± 0.05 Mpa.

16th Formulation Example

A composition of the 16th formulation example and a water content and Young's modulus of the material manufactured by the 16th formulation example are listed in Table 16. Specifically, a contact lens whose material is hydrogel can be manufactured by the 16th formulation example.

TABLE 16

| Function | Ingredient | Content (wt %) |
|---|---|---|
| monomer | 2-hydroxyethyl methacrylate | 43 |
| monomer | glycerol monomethacrylate | 40 |
| crosslinking agent | ethylene glycol dimethacrylate | 1.5 |
| crosslinking agent | 1,1,1-trimethylol propane trimethacrylate | 1 |
| diluent | polyethylene glycol 800 | 12.5 |
| initiator | 2-hydroxy-2-methyl-propiophenone | 0.5 |
| UV blocking agent | 2-(2'-hydroxy-5'-methacryloxyethylphenyl)-2H-benzotriazole | 1.5 |

Note:
the material manufactured by the 16th formulation example is hydrogel, the water content thereof is 57 ± 2 wt %, and the Young's modulus thereof is 0.4 ± 0.05 Mpa

17th Formulation Example

A composition of the 17th formulation example and a water content and Young's modulus of the material manufactured by the 17th formulation example are listed in Table 17. Specifically, a contact lens whose material is silicone hydrogel can be manufactured by the 17th formulation example.

TABLE 17

| Function | Ingredient | Content (wt %) |
|---|---|---|
| monomer | 3-methacryloyloxypropyltris(trimethylsilyloxy)silane | 28 |
| monomer | N-vinyl-2-pyrrolidinone | 20 |
| monomer | N,N-dimethyl acrylamide | 10 |
| monomer | 2-hydroxyethyl methacrylate | 6 |
| monomer | 3-(3-methacryloxy-2-hydroxypropoxy)propylbis(trimethylsiloxy)methylsilane | 21.5 |
| monomer | methacrylic acid | 1.5 |
| crosslinking agent | ethylene glycol dimethacrylate | 1 |
| diluent | ethanol | 10 |
| initiator | 2-hydroxy-2-methyl-propiophenone | 1 |

TABLE 17-continued

| Function | Ingredient | Content (wt %) |
|---|---|---|
| UV blocking agent | 2-(4-benzoyl-3-hydroxyphenoxy)ethyl acrylate | 1 |

Note:
the material manufactured by the 17th formulation example is silicone hydrogel, the water content thereof is 47 ± 2 wt %, and the Young's modulus thereof is 0.7 ± 0.1 Mpa.

18th Formulation Example

A composition of the 18th formulation example and a water content and Young's modulus of the material manufactured by the 18th formulation example are listed in Table 18. Specifically, a contact lens whose material is silicone hydrogel can be manufactured by the 18th formulation example.

TABLE 18

| Function | Ingredient | Content (wt %) |
|---|---|---|
| monomer | 3-methacryloyloxypropyltris(trimethylsilyloxy)silane | 30 |
| monomer | N-vinyl-2-pyrrolidinone | 20 |
| monomer | N,N-dimethyl acrylamide | 12 |
| monomer | 2-hydroxyethyl methacrylate | 5.5 |
| monomer | (3-acryloxy-2-hydroxypropoxypropyl) terminated polydimethylsiloxane | 20 |
| crosslinking agent | ethylene glycol dimethacrylate | 1 |
| diluent | ethanol | 10 |
| initiator | 2-hydroxy-2-methyl-propiophenone | 0.5 |
| blue-light blocking agent | 4-(phenyldiazenyl)phenyl methacrylate | 1 |

Note:
the material manufactured by the 18th formulation example is silicone hydrogel, the water content thereof is 47 ± 2 wt %, and the Young's modulus thereof is 0.7 ± 0.1 Mpa.

19th Formulation Example

A composition of the 19th formulation example and a water content and Young's modulus of the material manufactured by the 19th formulation example are listed in Table 19. Specifically, a contact lens whose material is silicone hydrogel can be manufactured by the 19th formulation example.

TABLE 19

| Function | Ingredient | Content (wt %) |
|---|---|---|
| monomer | 3-methacryloyloxypropyltris(trimethylsilyloxy)silane | 28 |
| monomer | N-vinyl-2-pyrrolidinone | 20 |
| monomer | N,N-dimethyl acrylamide | 10 |
| monomer | 2-hydroxyethyl methacrylate | 6 |
| monomer | 3-(3-methacryloxy-2-hydroxypropoxy)propylbis(trimethylsiloxy)methylsilane | 21.5 |
| monomer | methacrylic acid | 1.5 |
| crosslinking agent | ethylene glycol dimethacrylate | 1 |
| diluent | isopropyl alcohol | 10 |
| initiator | 2-hydroxy-2-methyl-propiophenone | 1 |
| UV blocking agent | 2-(4-benzoyl-3-hydroxyphenoxy)ethyl acrylate | 0.5 |

TABLE 19-continued

| Function | Ingredient | Content (wt %) |
|---|---|---|
| blue-light blocking agent | 4-(phenyldiazenyl)phenyl methacrylate | 0.5 |

Note:
the material manufactured by the 19th formulation example is silicone hydrogel, the water content thereof is 47 ± 2 wt %, and the Young's modulus thereof is 0.7 ± 0.1 Mpa.

20th Formulation Example

A composition of the 20th formulation example and a water content and Young's modulus of the material manufactured by the 20th formulation example are listed in Table 20. Specifically, a contact lens whose material is silicone hydrogel can be manufactured by the 20th formulation example.

TABLE 20

| Function | Ingredient | Content (wt %) |
|---|---|---|
| monomer | 3-methacryloyloxypropyltris(trimethylsilyloxy)silane | 30 |
| monomer | N-vinyl-2-pyrrolidinone | 20 |
| monomer | N,N-dimethyl acrylamide | 12 |
| monomer | 2-hydroxyethyl methacrylate | 5.5 |
| monomer | (3-acryloxy-2-hydroxypropoxypropyl)terminated polydimethylsiloxane | 20 |
| crosslinking agent | ethylene glycol dimethacrylate | 1 |
| diluent | isopropyl alcohol | 10 |
| initiator | 2-hydroxy-2-methyl-propiophenone | 0.5 |
| UV blocking agent | 2-(4-benzoyl-3-hydroxyphenoxy)ethyl acrylate | 1 |

Note:
the material manufactured by the 20th formulation example is silicone hydrogel, the water content thereof is 47 ± 2 wt %, and the Young's modulus thereof is 0.7 ± 0.1 Mpa

21st Formulation Example

A composition of the 21st formulation example and a water content and Young's modulus of the material manufactured by the 21st formulation example are listed in Table 21. Specifically, a contact lens whose material is silicone hydrogel can be manufactured by the 21st formulation example.

TABLE 21

| Function | Ingredient | Content (wt %) |
|---|---|---|
| monomer | 3-methacryloyloxypropyltris(trimethylsilyloxy)silane | 28 |
| monomer | N-vinyl-2-pyrrolidinone | 20 |
| monomer | N,N-dimethyl acrylamide | 10 |
| monomer | 2-hydroxyethyl methacrylate | 6 |
| monomer | 3-(3-methacryloxy-2-hydroxypropoxy)propylbis(trimethylsiloxy)methylsilane | 21.5 |
| monomer | methacrylic acid | 1.5 |
| crosslinking agent | ethylene glycol dimethacrylate | 1 |
| diluent | 1-hexanol | 10 |
| initiator | 2-hydroxy-2-methyl-propiophenone | 1 |
| UV blocking agent | 2-(4-benzoyl-3-hydroxyphenoxy)ethyl acrylate | 1 |

Note:
the material manufactured by the 21st formulation example is silicone hydrogel, the water content thereof is 47 ± 2 wt %, and the Young's modulus thereof is 0.7 ± 0.1 Mpa.

22nd Formulation Example

A composition of the 22nd formulation example and a water content and Young's modulus of the material manufactured by the 22nd formulation example are listed in Table 22. Specifically, a contact lens whose material is silicone hydrogel can be manufactured by the 22nd formulation example.

TABLE 22

| Function | Ingredient | Content (wt %) |
|---|---|---|
| monomer | 3-methacryloyloxypropyltris(trimethylsilyloxy)silane | 30 |
| monomer | N-vinyl-2-pyrrolidinone | 20 |
| monomer | N,N-dimethyl acrylamide | 12 |
| monomer | 2-hydroxyethyl methacrylate | 5.5 |
| monomer | (3-acryloxy-2-hydroxypropoxypropyl)terminated polydimethylsiloxane | 20 |
| crosslinking agent | ethylene glycol dimethacrylate | 1 |
| diluent | 1-hexanol | 10 |
| initiator | 2-hydroxy-2-methyl-propiophenone | 0.5 |
| blue-light blocking agent | 4-(phenyldiazenyl)phenyl methacrylate | 1 |

Note:
the material manufactured by the 22nd formulation example is silicone hydrogel, the water content thereof is 47 ± 2 wt %, and the Young's modulus thereof is 0.7 ± 0.1 Mpa.

23rd Formulation Example

A composition of the 23rd formulation example and a water content and Young's modulus of the material manufactured by the 23rd formulation example are listed in Table 23. Specifically, a contact lens whose material is silicone hydrogel can be manufactured by the 23rd formulation example.

TABLE 23

| Function | Ingredient | Content (wt %) |
|---|---|---|
| monomer | 3-methacryloyloxypropyltris(trimethylsilyloxy)silane | 28 |
| monomer | N-vinyl-2-pyrrolidinone | 20 |
| monomer | N,N-dimethyl acrylamide | 10 |
| monomer | 2-hydroxyethyl methacrylate | 6 |
| monomer | 3-(3-methacryloxy-2-hydroxypropoxy)propylbis(trimethylsiloxy)methylsilane | 21.5 |
| monomer | methacrylic acid | 1.5 |
| crosslinking agent | ethylene glycol dimethacrylate | 1 |
| diluent | 1,4-butanediol | 10 |
| initiator | 2-hydroxy-2-methyl-propiophenone | 1 |
| UV blocking agent | 2-(4-benzoyl-3-hydroxyphenoxy)ethyl acrylate | 0.5 |
| blue-light blocking agent | 4-(phenyldiazenyl)phenyl methacrylate | 0.5 |

Note:
the material manufactured by the 23rd formulation example is silicone hydrogel, the water content thereof is 47 ± 2 wt %, and the Young's modulus thereof is 0.7 ± 0.1 Mpa.

24th Formulation Example

A composition of the 24th formulation example and a water content and Young's modulus of the material manufactured by the 24th formulation example are listed in Table 24. Specifically, a contact lens whose material is silicone hydrogel can be manufactured by the 24th formulation example.

TABLE 24

| Function | Ingredient | Content (wt %) |
|---|---|---|
| monomer | 3-methacryloyloxypropyltris(trimethylsilyloxy)silane | 30 |
| monomer | N-vinyl-2-pyrrolidinone | 20 |
| monomer | N,N-dimethyl acrylamide | 12 |
| monomer | 2-hydroxyethyl methacrylate | 5.5 |
| monomer | (3-acryloxy-2-hydroxypropoxypropyl)terminated polydimethylsiloxane | 20 |
| crosslinking agent | ethylene glycol dimethacrylate | 1 |
| diluent | 1,4-butanediol | 10 |
| initiator | 2-hydroxy-2-methyl-propiophenone | 0.5 |
| UV blocking agent | 2-(4-benzoyl-3-hydroxyphenoxy)ethyl acrylate | 1 |

Note:
the material manufactured by the 24th formulation example is silicone hydrogel, the water content thereof is 47 ± 2 wt %, and the Young's modulus thereof is 0.7 ± 0.1 Mpa.

25th Formulation Example

A composition of the 25th formulation example and a water content and Young's modulus of the material manufactured by the 25th formulation example are listed in Table 25. Specifically, a contact lens whose material is silicone hydrogel can be manufactured by the 25th formulation example.

TABLE 25

| Function | Ingredient | Content (wt %) |
|---|---|---|
| monomer | 3-methacryloyloxypropyltris(trimethylsilyloxy)silane | 28 |
| monomer | N-vinyl-2-pyrrolidinone | 20 |
| monomer | N,N-dimethyl acrylamide | 10 |
| monomer | 2-hydroxyethyl methacrylate | 6 |
| monomer | 3-(3-methacryloxy-2-hydroxypropoxy)propylbis(trimethylsiloxy)methylsilane | 21.5 |
| monomer | methacrylic acid | 1.5 |
| crosslinking agent | ethylene glycol dimethacrylate | 2 |
| diluent | polyethylene glycol 4000 | 9 |
| initiator | 2-hydroxy-2-methyl-propiophenone | 1 |
| UV blocking agent | 2-(4-benzoyl-3-hydroxyphenoxy)ethyl acrylate | 1 |

Note:
the material manufactured by the 25th formulation example is silicone hydrogel, the water content thereof is 47 ± 2 wt %, and the Young's modulus thereof is 1.5 ± 0.1 Mpa.

26th Formulation Example

A composition of the 26th formulation example and a water content and Young's modulus of the material manufactured by the 26th formulation example are listed in Table 26. Specifically, a contact lens whose material is silicone hydrogel can be manufactured by the 26th formulation example.

TABLE 26

| Function | Ingredient | Content (wt %) |
|---|---|---|
| monomer | 3-methacryloyloxypropyltris(trimethylsilyloxy)silane | 30 |
| monomer | N-vinyl-2-pyrrolidinone | 20 |
| monomer | N,N-dimethyl acrylamide | 12 |
| monomer | 2-hydroxyethyl methacrylate | 5.5 |
| monomer | (3-acryloxy-2-hydroxypropoxypropyl)terminated polydimethylsiloxane | 20 |

TABLE 26-continued

| Function | Ingredient | Content (wt %) |
|---|---|---|
| crosslinking agent | ethylene glycol dimethacrylate | 2 |
| diluent | polyethylene glycol 4000 | 9 |
| initiator | 2-hydroxy-2-methyl-propiophenone | 0.5 |
| blue-light blocking agent | 4-(phenyldiazenyl)phenyl methacrylate | 1 |

Note:
the material manufactured by the 26th formulation example is silicone hydrogel, the water content thereof is 47 ± 2 wt %, and the Young's modulus thereof is 1.5 ± 0.1 Mpa.

27th Formulation Example

A composition of the 27th formulation example and a water content and Young's modulus of the material manufactured by the 27th formulation example are listed in Table 27. Specifically, a contact lens whose material is silicone hydrogel can be manufactured by the 27th formulation example.

TABLE 27

| Function | Ingredient | Content (wt %) |
|---|---|---|
| monomer | 3-methacryloyloxypropyltris(trimethylsilyloxy)silane | 28 |
| monomer | N-vinyl-2-pyrrolidinone | 20 |
| monomer | N,N-dimethyl acrylamide | 10 |
| monomer | 2-hydroxyethyl methacrylate | 6 |
| monomer | 3-(3-methacryloxy-2-hydroxypropoxy)propylbis(trimethylsiloxy)methylsilane | 21.5 |
| monomer | methacrylic acid | 1.5 |
| crosslinking agent | ethylene glycol dimethacrylate | 2 |
| diluent | polyethylene glycol 2000 | 9 |
| initiator | 2-hydroxy-2-methyl-propiophenone | 1 |
| UV blocking agent | 2-(4-benzoyl-3-hydroxyphenoxy)ethyl acrylate | 0.5 |
| blue-light blocking agent | 4-(phenyldiazenyl)phenyl methacrylate | 0.5 |

Note:
the material manufactured by the 27th formulation example is silicone hydrogel, the water content thereof is 47 ± 2 wt %, and the Young's modulus thereof is 1.3 ± 0.1 Mpa.

28th Formulation Example

A composition of the 28th formulation example and a water content and Young's modulus of the material manufactured by the 28th formulation example are listed in Table 28. Specifically, a contact lens whose material is silicone hydrogel can be manufactured by the 28th formulation example.

TABLE 28

| Function | Ingredient | Content (wt %) |
|---|---|---|
| monomer | 3-methacryloyloxypropyltris(trimethylsilyloxy)silane | 30 |
| monomer | N-vinyl-2-pyrrolidinone | 20 |
| monomer | N,N-dimethyl acrylamide | 12 |
| monomer | 2-hydroxyethyl methacrylate | 5.5 |
| monomer | (3-acryloxy-2-hydroxypropoxypropyl)terminated polydimethylsiloxane | 20 |
| crosslinking agent | ethylene glycol dimethacrylate | 2 |
| diluent | polyethylene glycol 2000 | 9 |

TABLE 28-continued

| Function | Ingredient | Content (wt %) |
|---|---|---|
| initiator | 2-hydroxy-2-methyl-propiophenone | 0.5 |
| UV blocking agent | 2-(4-benzoyl-3-hydroxyphenoxy)ethyl acrylate | 1 |

Note:
the material manufactured by the 28th formulation example is silicone hydrogel, the water content thereof is 47 ± 2 wt %, and the Young's modulus thereof is 1.3 ± 0.1 Mpa.

29th Formulation Example

A composition of the 29th formulation example and a water content and Young's modulus of the material manufactured by the 29th formulation example are listed in Table 29. Specifically, a contact lens whose material is silicone hydrogel can be manufactured by the 29th formulation example.

TABLE 29

| Function | Ingredient | Content (wt %) |
|---|---|---|
| monomer | 3-methacryloyloxypropyltris(trimethylsilyloxy)silane | 28 |
| monomer | N-vinyl-2-pyrrolidinone | 20 |
| monomer | N,N-dimethyl acrylamide | 10 |
| monomer | 2-hydroxyethyl methacrylate | 6 |
| monomer | 3-(3-methacryloxy-2-hydroxypropoxy)propylbis(trimethylsiloxy)methylsilane | 21.5 |
| monomer | methacrylic acid | 1.5 |
| crosslinking agent | ethylene glycol dimethacrylate | 2 |
| diluent | polyethylene glycol 1000 | 9 |
| initiator | 2-hydroxy-2-methyl-propiophenone | 1 |
| UV blocking agent | 2-(4-benzoyl-3-hydroxyphenoxy)ethyl acrylate | 1 |

Note:
the material manufactured by the 29th formulation example is silicone hydrogel, the water content thereof is 47 ± 2 wt %, and the Young's modulus thereof is 1.2 ± 0.1 Mpa.

30th Formulation Example

A composition of the 30th formulation example and a water content and Young's modulus of the material manufactured by the 30th formulation example are listed in Table 30. Specifically, a contact lens whose material is silicone hydrogel can be manufactured by the 30th formulation example.

TABLE 30

| Function | Ingredient | Content (wt %) |
|---|---|---|
| monomer | 3-methacryloyloxypropyltris(trimethylsilyloxy)silane | 30 |
| monomer | N-vinyl-2-pyrrolidinone | 20 |
| monomer | N,N-dimethyl acrylamide | 12 |
| monomer | 2-hydroxyethyl methacrylate | 5.5 |
| monomer | (3-acryloxy-2-hydroxypropoxypropyl)terminated polydimethylsiloxane | 20 |
| crosslinking agent | ethylene glycol dimethacrylate | 2 |
| diluent | polyethylene glycol 1000 | 9 |
| initiator | 2-hydroxy-2-methyl-propiophenone | 0.5 |
| blue-light blocking agent | 4-(phenyldiazenyl)phenyl methacrylate | 1 |

Note:
the material manufactured by the 30th formulation example is silicone hydrogel, the water content thereof is 47 ± 2 wt %, and the Young's modulus thereof is 1.2 ± 0.1 Mpa.

31st Formulation Example

A composition of the 31st formulation example and a water content and Young's modulus of the material manufactured by the 31st formulation example are listed in Table 31. Specifically, a contact lens whose material is silicone hydrogel can be manufactured by the 31st formulation example.

TABLE 31

| Function | Ingredient | Content (wt %) |
| --- | --- | --- |
| monomer | 3-methacryloyloxypropyltris(trimethylsilyloxy)silane | 28 |
| monomer | N-vinyl-2-pyrrolidinone | 20 |
| monomer | N,N-dimethyl acrylamide | 10 |
| monomer | 2-hydroxyethyl methacrylate | 6 |
| monomer | 3-(3-methacryloxy-2-hydroxypropoxy) propylbis(trimethylsiloxy)methylsilane | 21.5 |
| monomer | methacrylic acid | 1.5 |
| crosslinking agent | ethylene glycol dimethacrylate | 2 |
| diluent | glycerol | 9 |
| initiator | 2-hydroxy-2-methyl-propiophenone | 1 |
| UV blocking agent | 2-(4-benzoyl-3-hydroxyphenoxy)ethyl acrylate | 0.5 |
| blue-light blocking agent | 4-(phenyldiazenyl)phenyl methacrylate | 0.5 |

Note:
the material manufactured by the 31st formulation example is silicone hydrogel, the water content thereof is 47 ± 2 wt %, and the Young's modulus thereof is 1 ± 0.1 Mpa.

32nd Formulation Example

A composition of the 32nd formulation example and a water content and Young's modulus of the material manufactured by the 32nd formulation example are listed in Table 32. Specifically, a contact lens whose material is silicone hydrogel can be manufactured by the 32nd formulation example.

TABLE 32

| Function | Ingredient | Content (wt %) |
| --- | --- | --- |
| monomer | 3-methacryloyloxypropyltris(trimethylsilyloxy)silane | 30 |
| monomer | N-vinyl-2-pyrrolidinone | 20 |
| monomer | N,N-dimethyl acrylamide | 12 |
| monomer | 2-hydroxyethyl methacrylate | 5.5 |
| monomer | (3-acryloxy-2-hydroxypropoxypropyl)terminated polydimethylsiloxane | 20 |
| crosslinking agent | ethylene glycol dimethacrylate | 2 |
| diluent | glycerol | 9 |
| initiator | 2-hydroxy-2-methyl-propiophenone | 0.5 |
| UV blocking agent | 2-(4-benzoyl-3-hydroxyphenoxy)ethyl acrylate | 1 |

Note:
the material manufactured by the 32nd formulation example is silicone hydrogel, the water content thereof is 47 ± 2 wt %, and the Young's modulus thereof is 1 ± 0.1 Mpa.

According to the above description of the contact lens and the composition thereof, the following 1st-8th specific examples are provided for further explanation.

1st Example

Figure 4A:
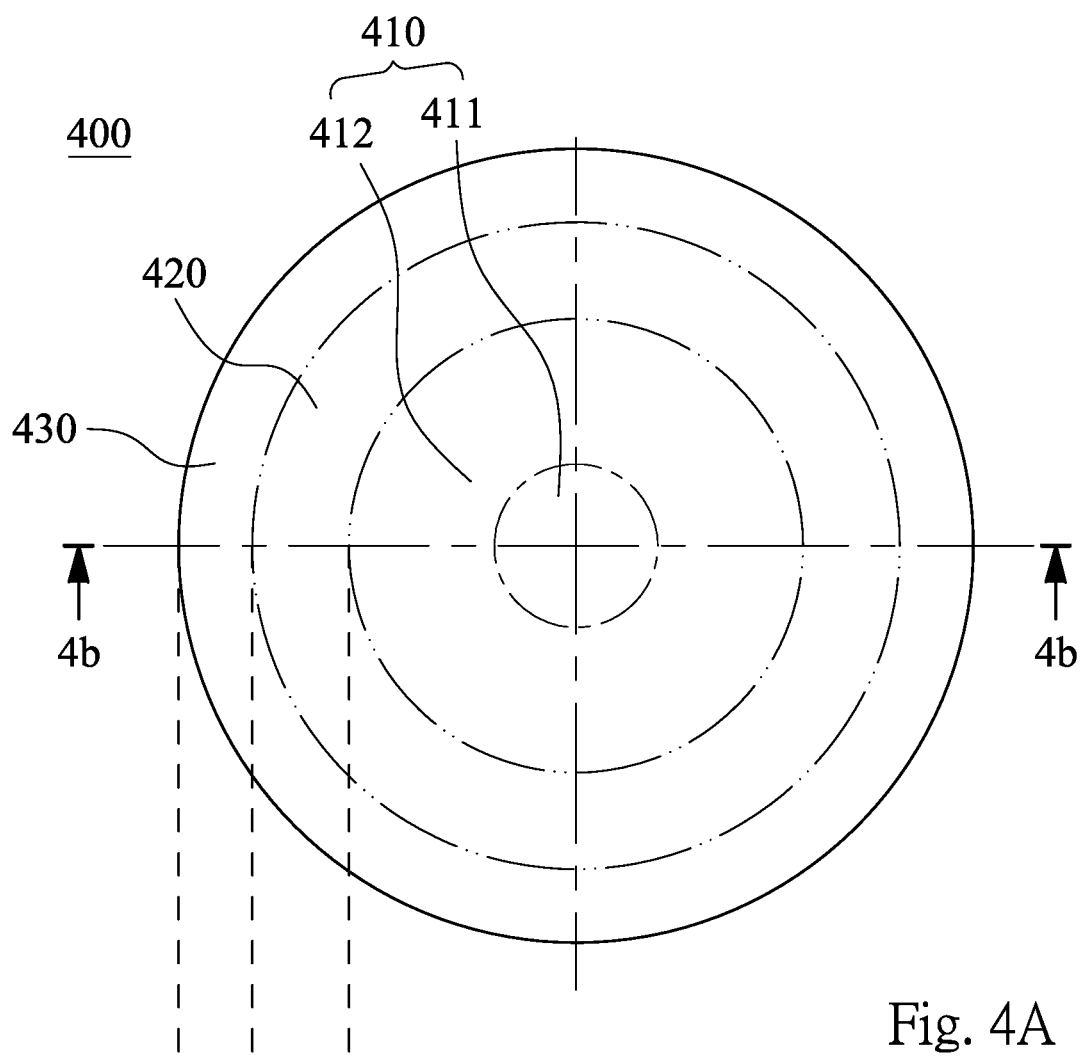
FIG. 4A is a schematic view of a contact lens according to the 1st example of the present disclosure.
Figure 4B:
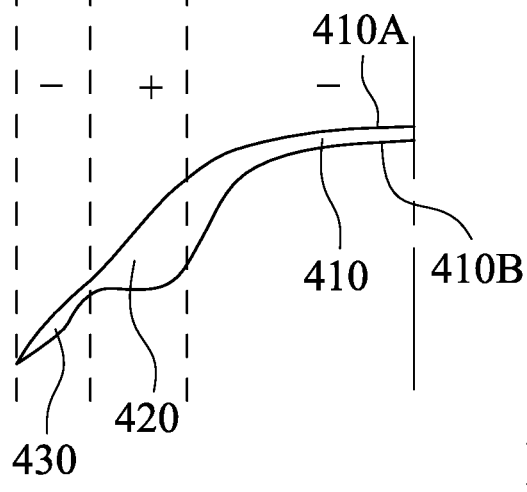
FIG. 4B is a partial cross-sectional view taken along line 4b-4b of the contact lens shown in FIG. 4A.

FIG. 4A is a schematic view of a contact lens 400 according to the 1st example of the present disclosure. FIG. 4B is a partial cross-sectional view taken along line 4b-4b of the contact lens 400 shown in FIG. 4A. In FIG. 4A and FIG. 4B, the contact lens 400 includes, in order from a center of the to a periphery, an optical zone 410, a first structural zone 420 and a second structural zone 430. The optical zone 410 provides a negative force, the first structural zone 420 provides a positive force and the second structural zone 430 provides a negative force.

The optical zone 410 includes a front surface 410A and a back surface 410B, wherein the front surface 410A is opposite to the back surface 410B, and at least one of the front surface 410A and the back surface 410B is aspheric. Furthermore, the optical zone 410 includes, in order from the center to the periphery, an optical central region 411 and a first optical annular region 412. The first optical annular region 412 concentrically surrounds the optical central region 411, wherein a diopter of the optical central region 411 is different from a diopter of the first optical annular region 412.

In the contact lens 400 according to the 1st example, the minimum thickness of the optical zone 410 providing the negative force is CTN1, the maximum thickness of the first structural zone 420 providing the positive force is CTP, the minimum thickness of the second structural zone 430 providing the negative force is CTN, a diameter of the optical central region 411 is DiC, an outer diameter of the first optical annular region 412 is DiP1, the diopter of the optical central region 411 is PowC, a maximum diopter of the first optical annular region 412 is PowP1. The values of CTN1, CTP, CTN, CTP/CTN1, CTP/CTN, DiC, DiP1, DiC/DiP1, PowC, PowP1 and |PowC−PowP1| of the 1st example are listed in Table 33.

TABLE 33

1st Example

| CTN1 (mm) | 0.17 | DiP1 (mm) | 8.00 |
|---|---|---|---|
| CTP (mm) | 0.70 | DiC/DiP1 | 0.38 |
| CTN (mm) | 0.02 | PowC (D) | 2.50 |
| CTP/CTN1 | 4.12 | PowP1 (D) | −2.00 |
| CTP/CTN | 35 | |PowC − PowP1| (D) | 4.50 |
| DiC (mm) | 3.00 | | |

Figure 4C:
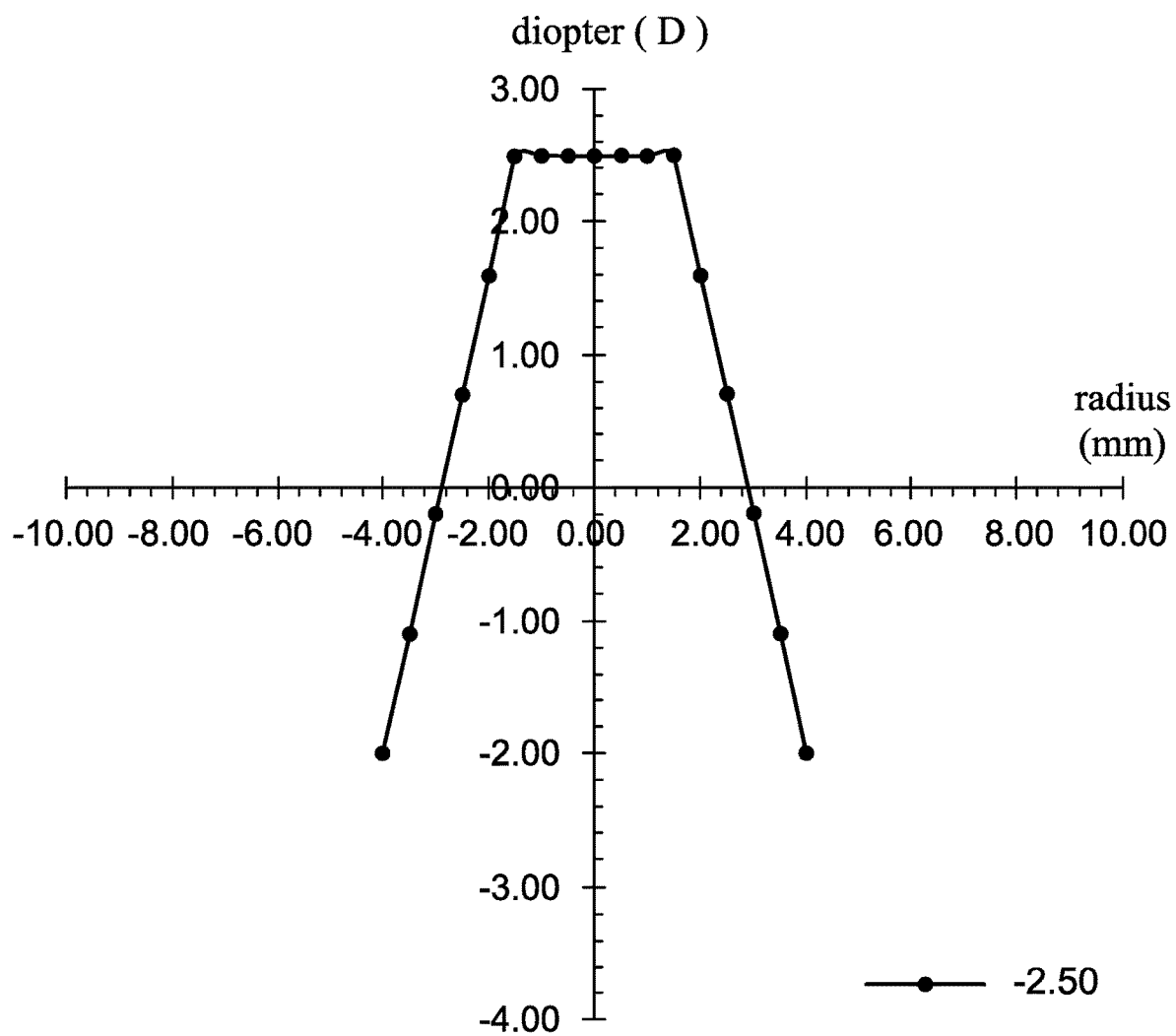
FIG. 4C shows a relationship between a radius and a diopter of the contact lens of the 1st example.

Please refer to Table 34 and FIG. 4C simultaneously. Radiuses and the correspondent diopters of the contact lens 400 of the 1st example are listed in Table 34. FIG. 4C shows a relationship between the radius and the diopter of the contact lens 400 of the 1st example (the negative radius having an opposite direction with the positive radius). As shown in Table 34 and FIG. 4C, the diopter of the optical central region 411 is fixed, the diopter of the first optical annular region 412 is different from the diopter of the optical central region 411. Specifically, the diopter of the first optical annular region 412 is smaller than the diopter of the optical central region 411, and the diopter of the first optical annular region 412 decreases when away from the optical central region 411. When the contact lens 400 is designed for correcting astigmatism, the diopter of the astigmatic axis can be varied from the center to the periphery according to practical demands, so that the contact lens 400 can be featured with multifocal property.

TABLE 34

1st Example

| radius (mm) | diopter (D) | radius (mm) | diopter (D) |
|---|---|---|---|
| −4.00 | −2.00 | 0.50 | 2.50 |
| −3.50 | −1.10 | 1.00 | 2.50 |
| −3.00 | −0.20 | 1.50 | 2.50 |
| −2.50 | 0.70 | 2.00 | 1.60 |
| −2.00 | 1.60 | 2.50 | 0.70 |
| −1.50 | 2.50 | 3.00 | −0.20 |
| −1.00 | 2.50 | 3.50 | −1.10 |
| −0.50 | 2.50 | 4.00 | −2.00 |
| 0.00 | 2.50 | | |

The composition for manufacturing the contact lens 400 can be the same as previously described, and will not be repeated herein. Specifically, the contact lens 400 can, but is not limited to, be manufactured according to one of the 1st formulation example to the 32nd formulation example.

2nd Example

Figure 5A:
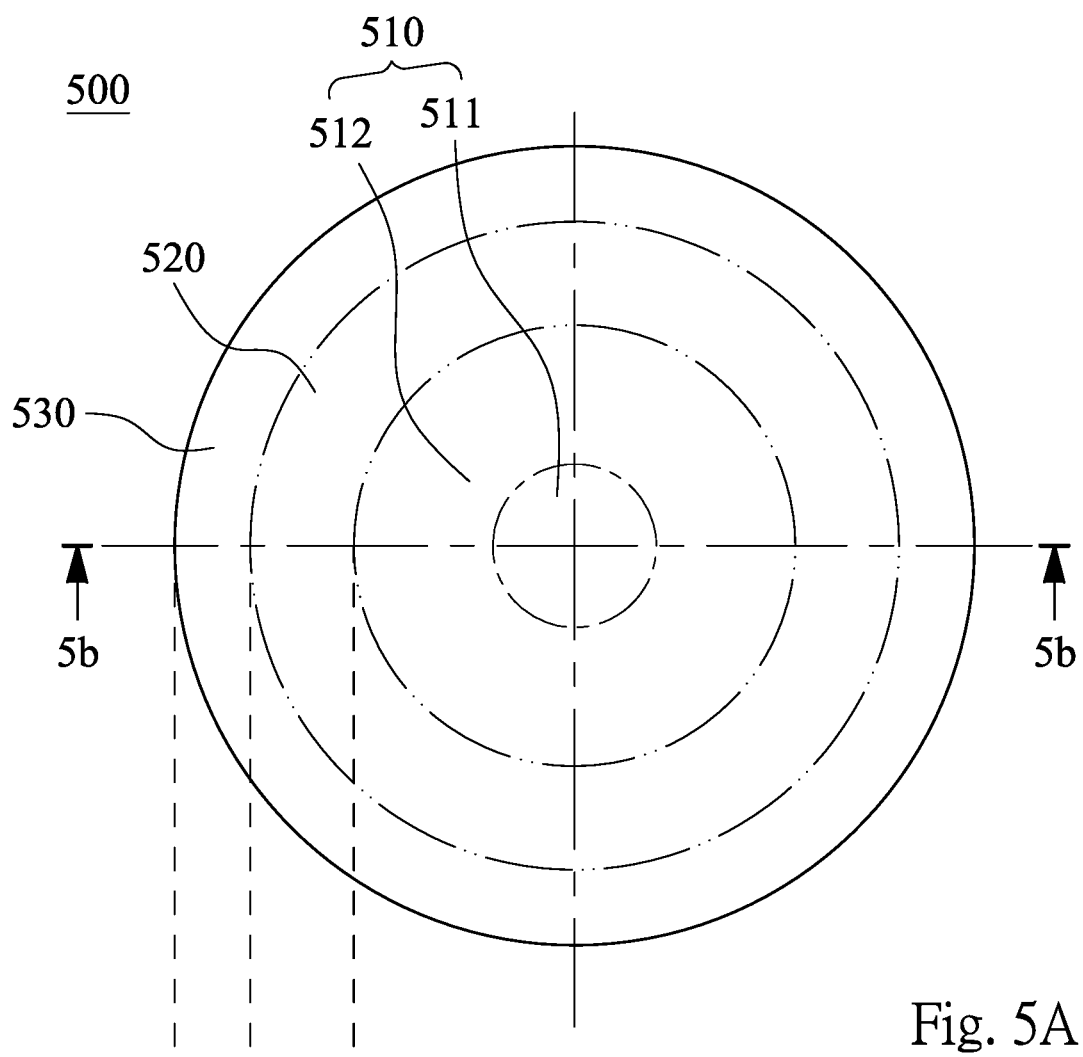
FIG. 5A is a schematic view of a contact lens according to the 2nd example of the present disclosure.
Figure 5B:
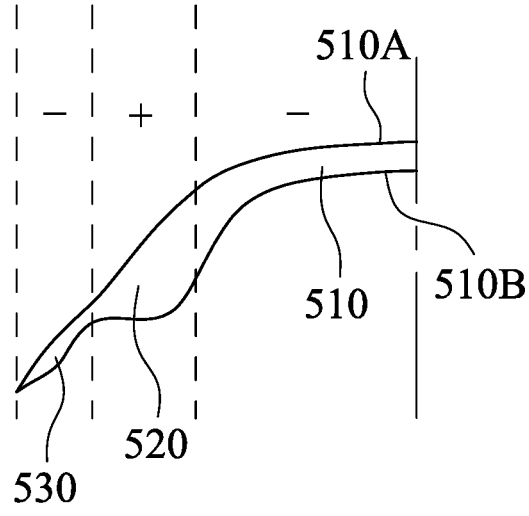
FIG. 5B is a partial cross-sectional view taken along line 5b-5b of the contact lens shown in FIG. 5A.

FIG. 5A is a schematic view of a contact lens 500 according to the 2nd example of the present disclosure. FIG. 5B is a partial cross-sectional view taken along line 5b-5b of the contact lens 500 shown in FIG. 5A. In FIG. 5A and FIG. 5B, the contact lens 500 includes, in order from a center of the to a periphery, an optical zone 510, a first structural zone 520 and a second structural zone 530. The optical zone 510 provides a negative force, the first structural zone 520 provides a positive force and the second structural zone 530 provides a negative force.

The optical zone 510 includes a front surface 510A and a back surface 510B, wherein the front surface 510A is opposite to the back surface 510B, and at least one of the front surface 510A and the back surface 510B is aspheric. Furthermore, the optical zone 510 includes, in order from the center to the periphery, an optical central region 511 and a first optical annular region 512. The first optical annular region 512 concentrically surrounds the optical central region 511, wherein a diopter of the optical central region 511 is different from a diopter of the first optical annular region 512.

In the contact lens 500 according to the 2nd example, the minimum thickness of the optical zone 510 providing the negative force is CTN1, the maximum thickness of the first structural zone 520 providing the positive force is CTP, the minimum thickness of the second structural zone 530 providing the negative force is CTN, a diameter of the optical central region 511 is DiC, an outer diameter of the first optical annular region 512 is DiP1, the diopter of the optical central region 511 is PowC, a maximum diopter of the first optical annular region 512 is PowP1. The values of CTN1, CTP, CTN, CTP/CTN1, CTP/CTN, DiC, DiP1, DiC/DiP1, PowC, PowP1 and |PowC−PowP1| of the 2nd example are listed in Table 35.

TABLE 35

2nd Example

| CTN1 (mm) | 0.28 | DiP1 (mm) | 11.00 |
|---|---|---|---|
| CTP (mm) | 0.75 | DiC/DiP1 | 0.36 |
| CTN (mm) | 0.03 | PowC (D) | 1.50 |
| CTP/CTN1 | 2.67 | PowP1 (D) | −1.50 |
| CTP/CTN | 25 | |PowC − PowP1| (D) | 3.00 |
| DiC (mm) | 4.00 | | |

Figure 5C:
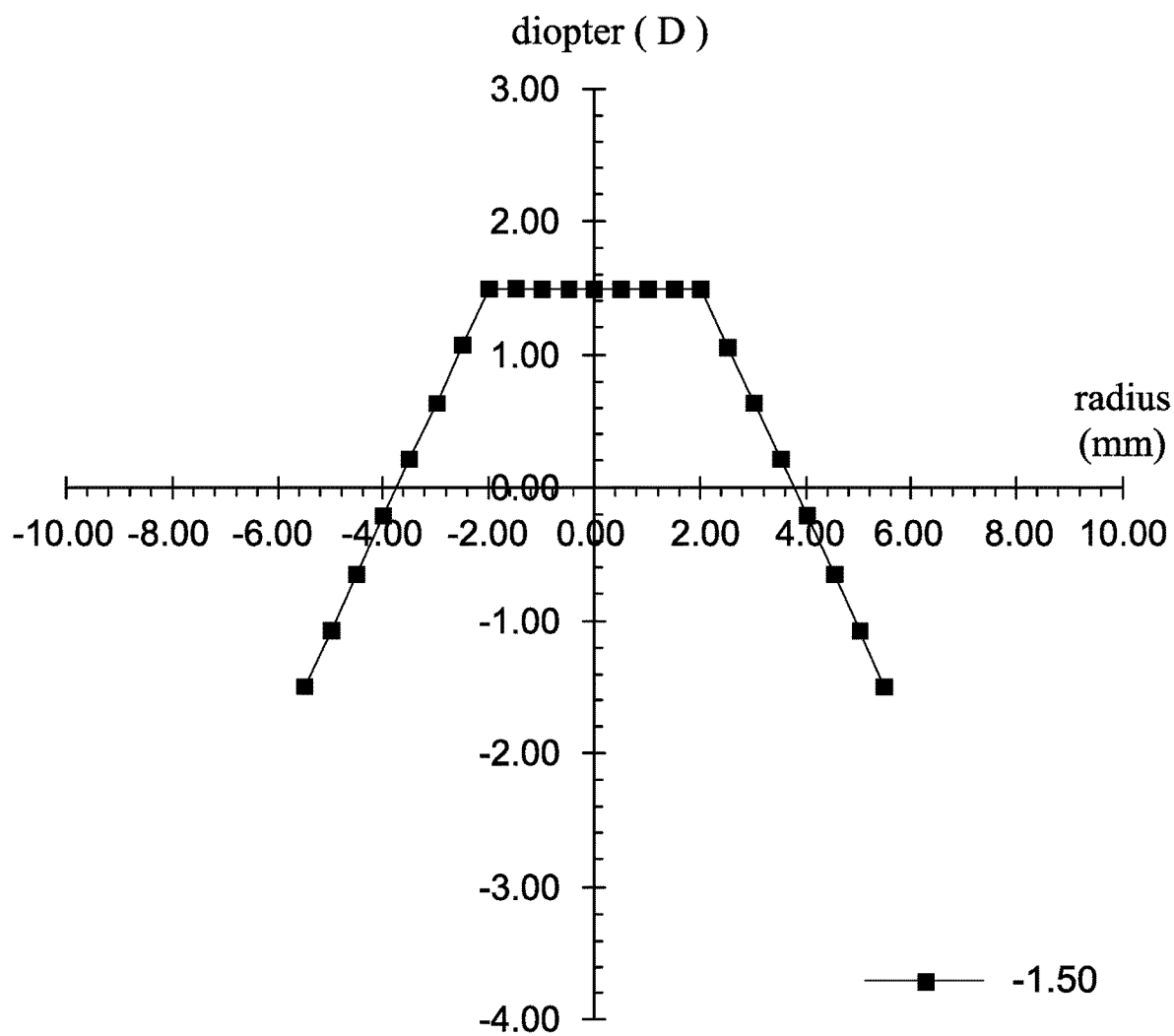
FIG. 5C shows a relationship between a radius and a diopter of the contact lens of the 2nd example.

Please refer to Table 36 and FIG. 5C simultaneously. Radiuses and the correspondent diopters of the contact lens 500 of the 2nd example are listed in Table 36. FIG. 5C shows a relationship between the radius and the diopter of the contact lens 500 of the 2nd example (the negative radius having an opposite direction with the positive radius). As shown in Table 36 and FIG. 5C, the diopter of the optical central region 511 is fixed, the diopter of the first optical annular region 512 is different from the diopter of the optical central region 511. Specifically, the diopter of the first optical annular region 512 is smaller than the diopter of the optical central region 511, and the diopter of the first optical annular region 512 decreases when away from the optical central region 511.

TABLE 36

2nd Example

| radius (mm) | diopter (D) | radius (mm) | diopter (D) |
|---|---|---|---|
| −5.50 | −1.50 | 0.50 | 1.50 |
| −5.00 | −1.07 | 1.00 | 1.50 |
| −4.50 | −0.64 | 1.50 | 1.50 |
| −4.00 | −0.21 | 2.00 | 1.50 |
| −3.50 | 0.21 | 2.50 | 1.07 |
| −3.00 | 0.64 | 3.00 | 0.64 |
| −2.50 | 1.07 | 3.50 | 0.21 |
| −2.00 | 1.50 | 4.00 | −0.21 |
| −1.50 | 1.50 | 4.50 | −0.64 |
| −1.00 | 1.50 | 5.00 | −1.07 |
| −0.50 | 1.50 | 5.50 | −1.50 |
| 0.00 | 1.50 | | |

The composition for manufacturing the contact lens 500 can be the same as previously described, and will not be repeated herein. Specifically, the contact lens 500 can, but is not limited to, be manufactured according to one of the 1st formulation example to the 32nd formulation example.

3rd Example

Figure 6A:
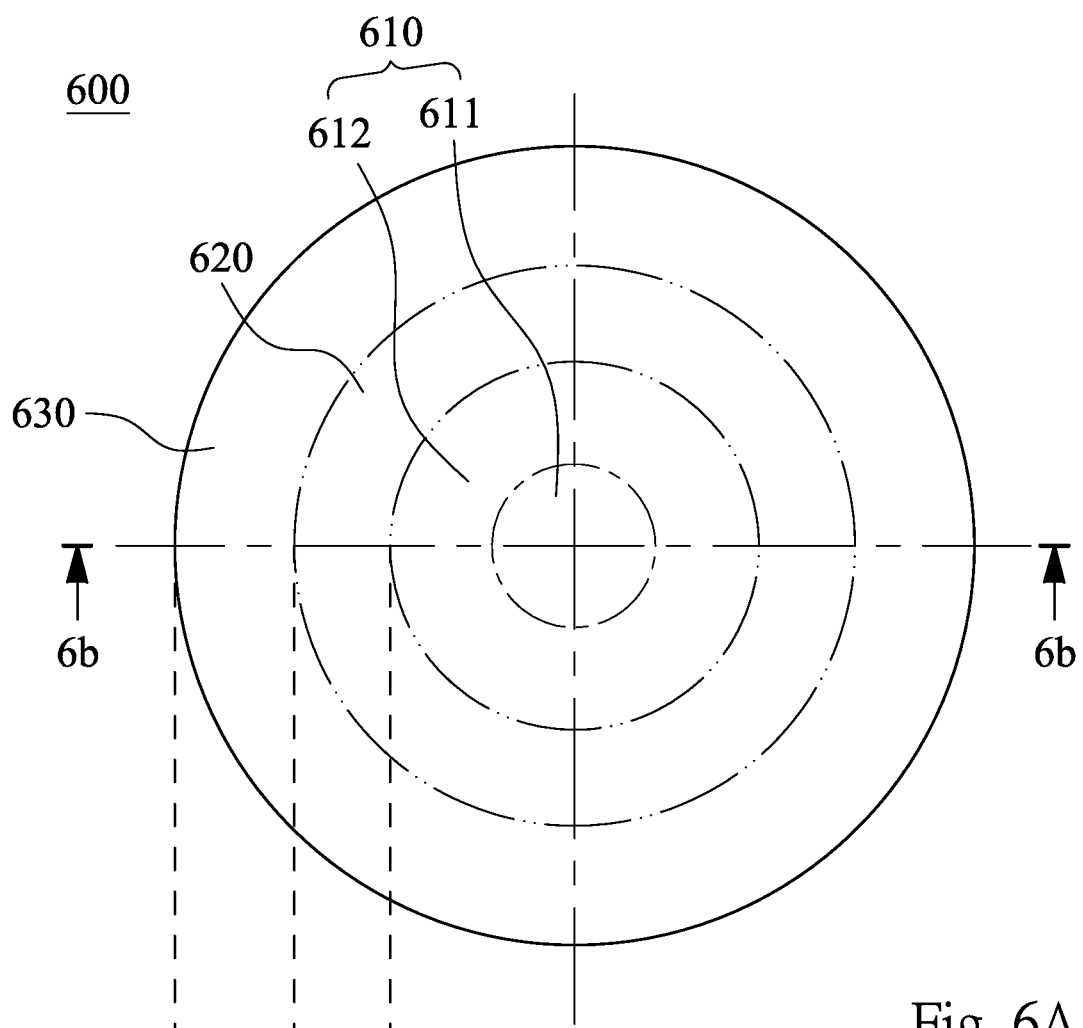
FIG. 6A is a schematic view of a contact lens according to the 3rd example of the present disclosure.
Figure 6B:
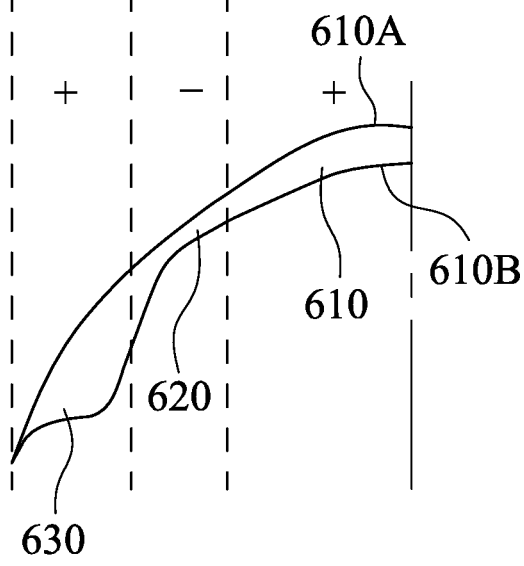
FIG. 6B is a partial cross-sectional view taken along line 6b-6b of the contact lens shown in FIG. 6A.

FIG. 6A is a schematic view of a contact lens 600 according to the 3rd example of the present disclosure. FIG. 6B is a partial cross-sectional view taken along line 6b-6b of the contact lens 600 shown in FIG. 6A. In FIG. 6A and FIG. 6B, the contact lens 600 includes, in order from a center of the to a periphery, an optical zone 610, a first structural zone 620 and a second structural zone 630. The optical zone 610 provides a positive force, the first structural zone 620 provides a negative force and the second structural zone 630 provides a positive force.

The optical zone 610 includes a front surface 610A and a back surface 610B, wherein the front surface 610A is opposite to the back surface 610B, and at least one of the front surface 610A and the back surface 610B is aspheric. Furthermore, the optical zone 610 includes, in order from the center to the periphery, an optical central region 611 and a first optical annular region 612. The first optical annular region 612 concentrically surrounds the optical central region 611, wherein a diopter of the optical central region 611 is different from a diopter of the first optical annular region 612.

In the contact lens 600 according to the 3rd example, the maximum thickness of the optical zone 610 providing the positive force is CTP1, the minimum thickness of the first structural zone 620 providing the negative force is CTN, the maximum thickness of the second structural zone 630 providing the positive force is CTP, a diameter of the optical central region 611 is DiC, an outer diameter of the first optical annular region 612 is DiP1, the diopter of the optical central region 611 is PowC, a maximum diopter of the first optical annular region 612 is PowP1. The values of CTP1, CTN, CTP, CTP1/CTN, CTP/CTN, DiC, DiP1, DiC/DiP1, PowC, PowP1 and |PowC−PowP1| of the 3rd example are listed in Table 37.

TABLE 37

3rd Example

| | | | |
|---|---|---|---|
| CTP1 (mm) | 0.34 | DiP1 (mm) | 10.00 |
| CTN (mm) | 0.21 | DiC/DiP1 | 0.50 |
| CTP (mm) | 0.90 | PowC (D) | −3.00 |
| CTP1/CTN | 1.62 | PowP1 (D) | −0.50 |
| CTP/CTN | 4.29 | |PowC − PowP1| (D) | 2.50 |
| DiC (mm) | 5.00 | | |

Figure 6C:
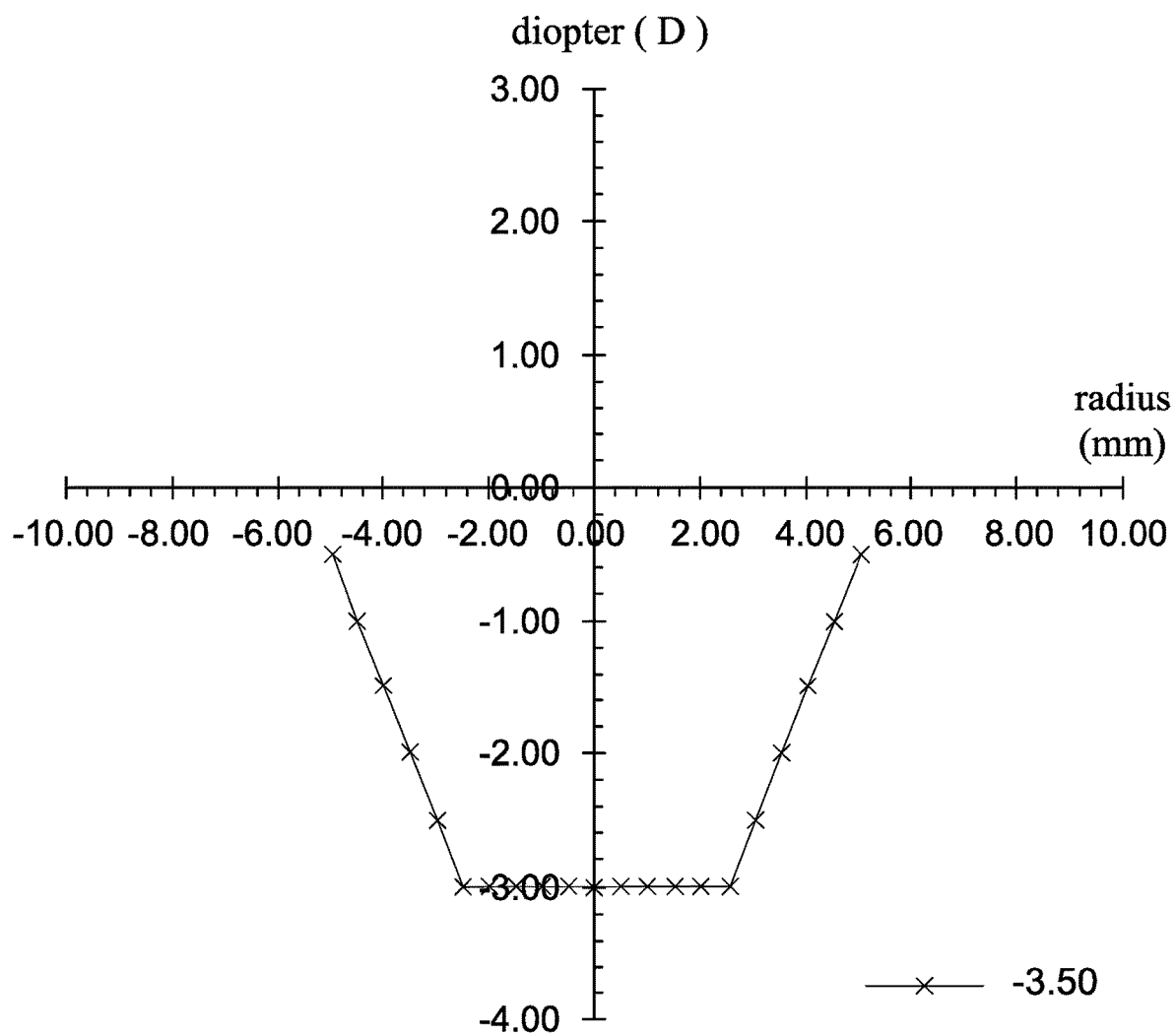
FIG. 6C shows a relationship between a radius and a diopter of the contact lens of the 3rd example.

Please refer to Table 38 and FIG. 6C simultaneously. Radiuses and the correspondent diopters of the contact lens 600 of the 3rd example are listed in Table 38. FIG. 6C shows a relationship between the radius and the diopter of the contact lens 600 of the 3rd example (the negative radius having an opposite direction with the positive radius). As shown in Table 38 and FIG. 6C, the diopter of the optical central region 611 is fixed, the diopter of the first optical annular region 612 is different from the diopter of the optical central region 611. Specifically, the diopter of the first optical annular region 612 is greater than the diopter of the optical central region 611, and the diopter of the first optical annular region 612 increases when away from the optical central region 611.

TABLE 38

3rd Example

| radius (mm) | diopter (D) | radius (mm) | diopter (D) |
|---|---|---|---|
| −5.00 | −0.50 | 0.50 | −3.00 |
| −4.50 | −1.00 | 1.00 | −3.00 |
| −4.00 | −1.50 | 1.50 | −3.00 |
| −3.50 | −2.00 | 2.00 | −3.00 |
| −3.00 | −2.50 | 2.50 | −3.00 |
| −2.50 | −3.00 | 3.00 | −2.50 |
| −2.00 | −3.00 | 3.50 | −2.00 |
| −1.50 | −3.00 | 4.00 | −1.50 |
| −1.00 | −3.00 | 4.50 | −1.00 |
| −0.50 | −3.00 | 5.00 | −0.50 |
| 0.00 | −3.00 | | |

The composition for manufacturing the contact lens 600 can be the same as previously described, and will not be repeated herein. Specifically, the contact lens 600 can, but is not limited to, be manufactured according to one of the 1st formulation example to the 32nd formulation example.

4th Example

Figure 7A:
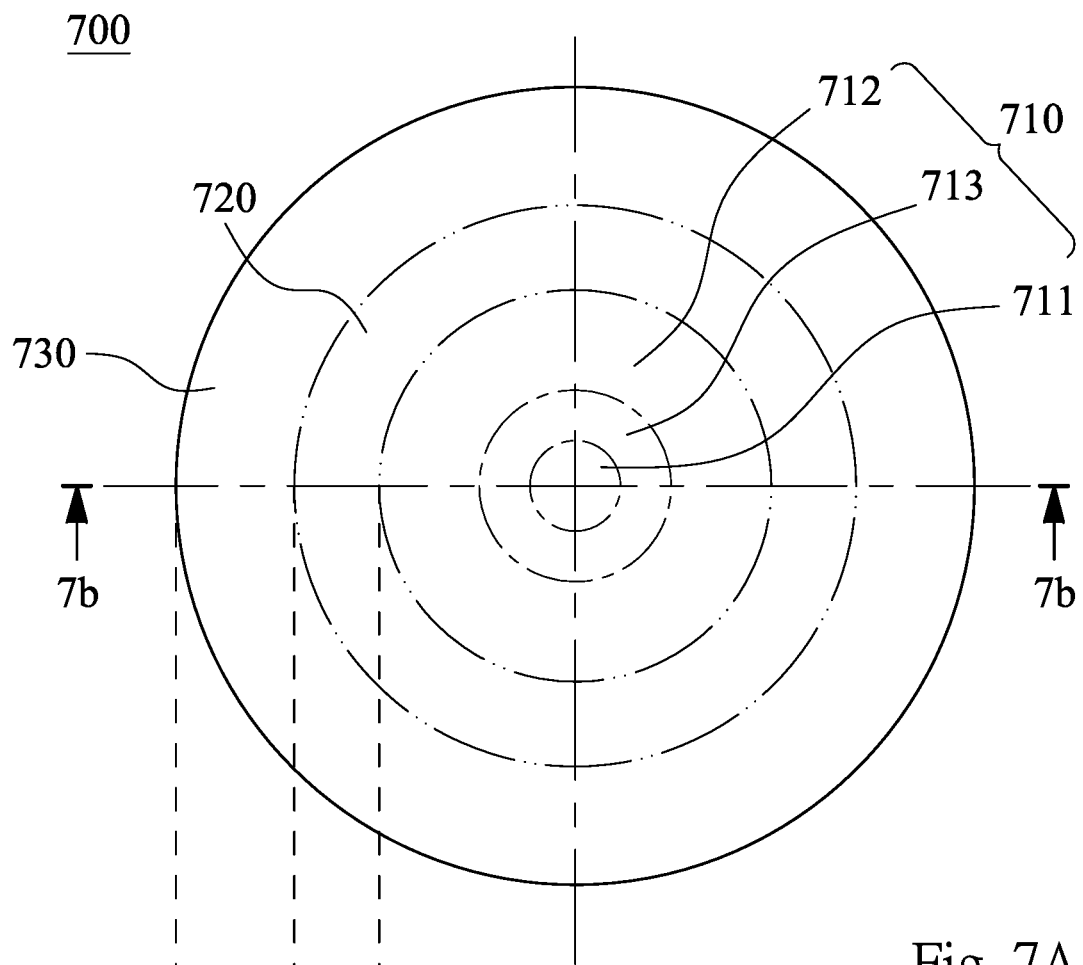
FIG. 7A is a schematic view of a contact lens according to the 4th example of the present disclosure.
Figure 7B:
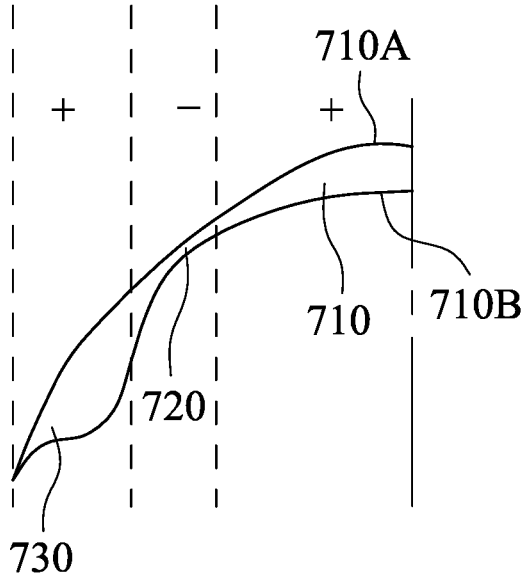
FIG. 7B is a partial cross-sectional view taken along line 7b-7b of the contact lens shown in FIG. 7A.

FIG. 7A is a schematic view of a contact lens 700 according to the 4th example of the present disclosure. FIG. 7B is a partial cross-sectional view taken along line 7b-7b of the contact lens 700 shown in FIG. 7A. In FIG. 7A and FIG. 7B, the contact lens 700 includes, in order from a center of the to a periphery, an optical zone 710, a first structural zone 720 and a second structural zone 730. The optical zone 710 provides a positive force, the first structural zone 720 provides a negative force and the second structural zone 730 provides a positive force.

The optical zone 710 includes a front surface 710A and a back surface 710B, wherein the front surface 710A is opposite to the back surface 710B, and at least one of the front surface 710A and the back surface 710B is aspheric. Furthermore, the optical zone 710 includes, in order from the center to the periphery, an optical central region 711, a second optical annular region 713 and a first optical annular region 712. The second optical annular region 713 and the first optical annular region 712 concentrically surround the optical central region 711, wherein a diopter of the optical central region 711 is different from a diopter of the first optical annular region 712, and the diopter of the optical central region 711 is different from a diopter of the second optical annular region 713.

In the contact lens 700 according to the 4th example, the maximum thickness of the optical zone 710 providing the positive force is CTP1, the minimum thickness of the first structural zone 720 providing the negative force is CTN, the maximum thickness of the second structural zone 730 providing the positive force is CTP, a diameter of the optical central region 711 is DiC, an outer diameter of the first optical annular region 712 is DiP1, an outer diameter of the second optical annular region 713 is DiP2, the diopter of the optical central region 711 is PowC, a maximum diopter of the first optical annular region 712 is PowP1, a maximum diopter of the second optical annular region 713 is PowP2. The values of CTP1, CTN, CTP, CTP1/CTN, CTP/CTN, DiC, DiP1, DiP2, DiC/DiP1, DiC/DiP2, PowC, PowP1, PowP2 and |PowC−PowP1| of the 4th example are listed in Table 39.

TABLE 39

4th Example

| CTP1 (mm) | 0.35 | DiP2 (mm) | 6.00 |
|---|---|---|---|
| CTN (mm) | 0.09 | DiC/DiP1 | 0.33 |
| CTP (mm) | 0.89 | DiC/DiP2 | 0.67 |
| CTP1/CTN | 3.89 | PowC (D) | −1.00 |
| CTP/CTN | 9.89 | PowP1 (D) | 0.25 |
| DiC (mm) | 4.00 | PowP2 (D) | −0.50 |
| DiP1 (mm) | 12.00 | |PowC − PowP1| (D) | 1.25 |

Figure 7C:
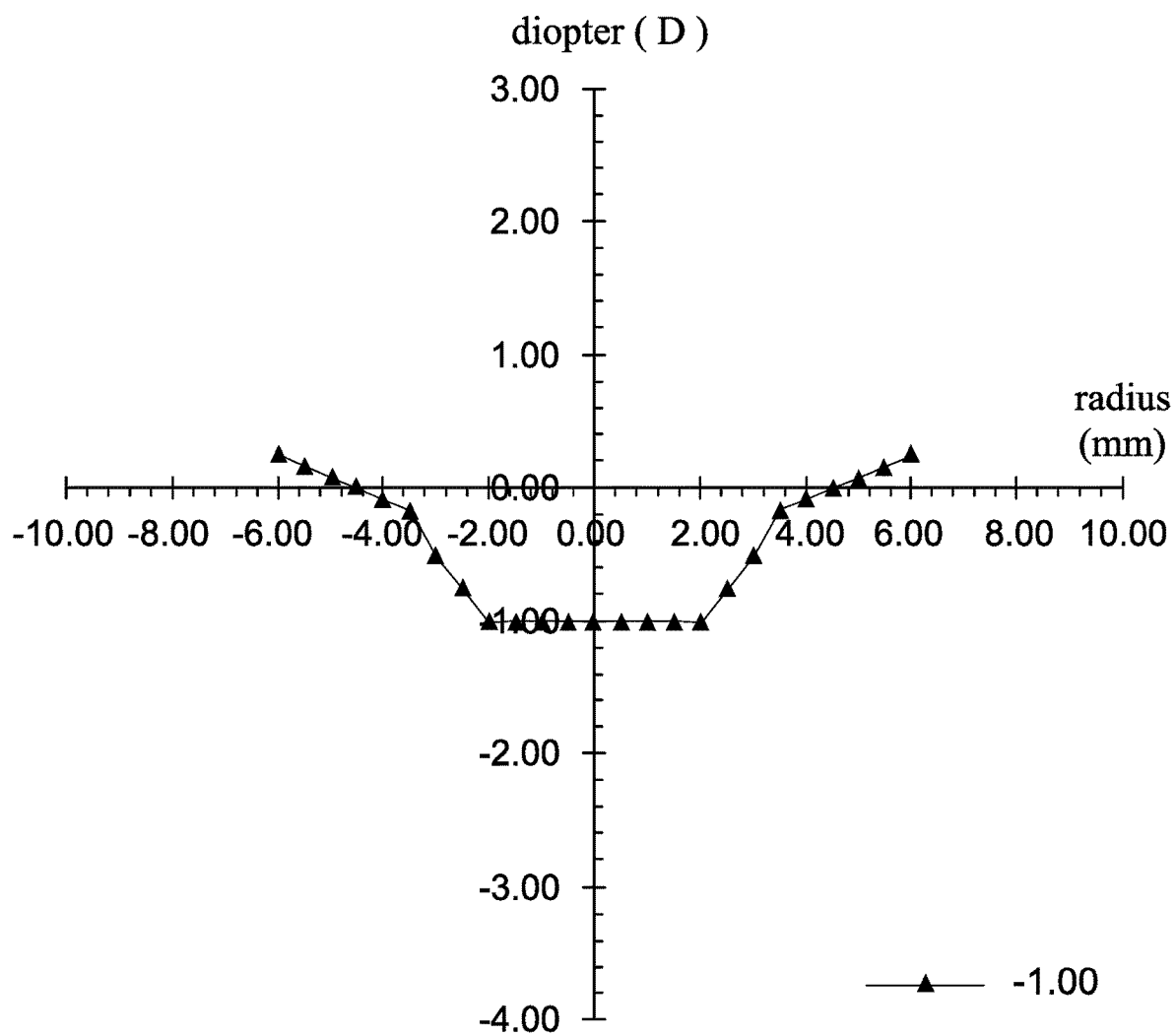
FIG. 7C shows a relationship between a radius and a diopter of the contact lens of the 4th example.

Please refer to Table 40 and FIG. 7C simultaneously. Radiuses and the correspondent diopters of the contact lens 700 of the 4th example are listed in Table 40. FIG. 7C shows a relationship between the radius and the diopter of the contact lens 700 of the 4th example (the negative radius having an opposite direction with the positive radius). As shown in Table 40 and FIG. 7C, the diopter of the optical central region 711 is fixed, the diopter of the second optical annular region 713 is different from the diopter of the optical central region 711, and the diopter of the first optical annular region 712 is different from the diopter of the second optical annular region 713. Specifically, the diopter of the second optical annular region 713 is greater than the diopter of the optical central region 711, the diopter of the first optical annular region 712 is greater than the diopter of the second optical annular region 713, and the diopter of the second optical annular region 713 and the diopter of the first optical annular region 712 increase when away from the optical central region 711.

TABLE 40

4th Example

| radius (mm) | diopter (D) | radius (mm) | diopter (D) |
|---|---|---|---|
| −6.00 | 0.25 | 0.50 | −1.00 |
| −5.50 | 0.17 | 1.00 | −1.00 |
| −5.00 | 0.08 | 1.50 | −1.00 |
| −4.50 | 0.00 | 2.00 | −1.00 |
| −4.00 | −0.08 | 2.50 | −0.75 |
| −3.50 | −0.17 | 3.00 | −0.50 |
| −3.00 | −0.50 | 3.50 | −0.17 |
| −2.50 | −0.75 | 4.00 | −0.08 |
| −2.00 | −1.00 | 4.50 | 0.00 |
| −1.50 | −1.00 | 5.00 | 0.08 |
| −1.00 | −1.00 | 5.50 | 0.17 |
| −0.50 | −1.00 | 6.00 | 0.25 |
| 0.00 | −1.00 | | |

The composition for manufacturing the contact lens 700 can be the same as previously described, and will not be repeated herein. Specifically, the contact lens 700 can, but is not limited to, be manufactured according to one of the 1st formulation example to the 32nd formulation example.

5th Example

Figure 8A:
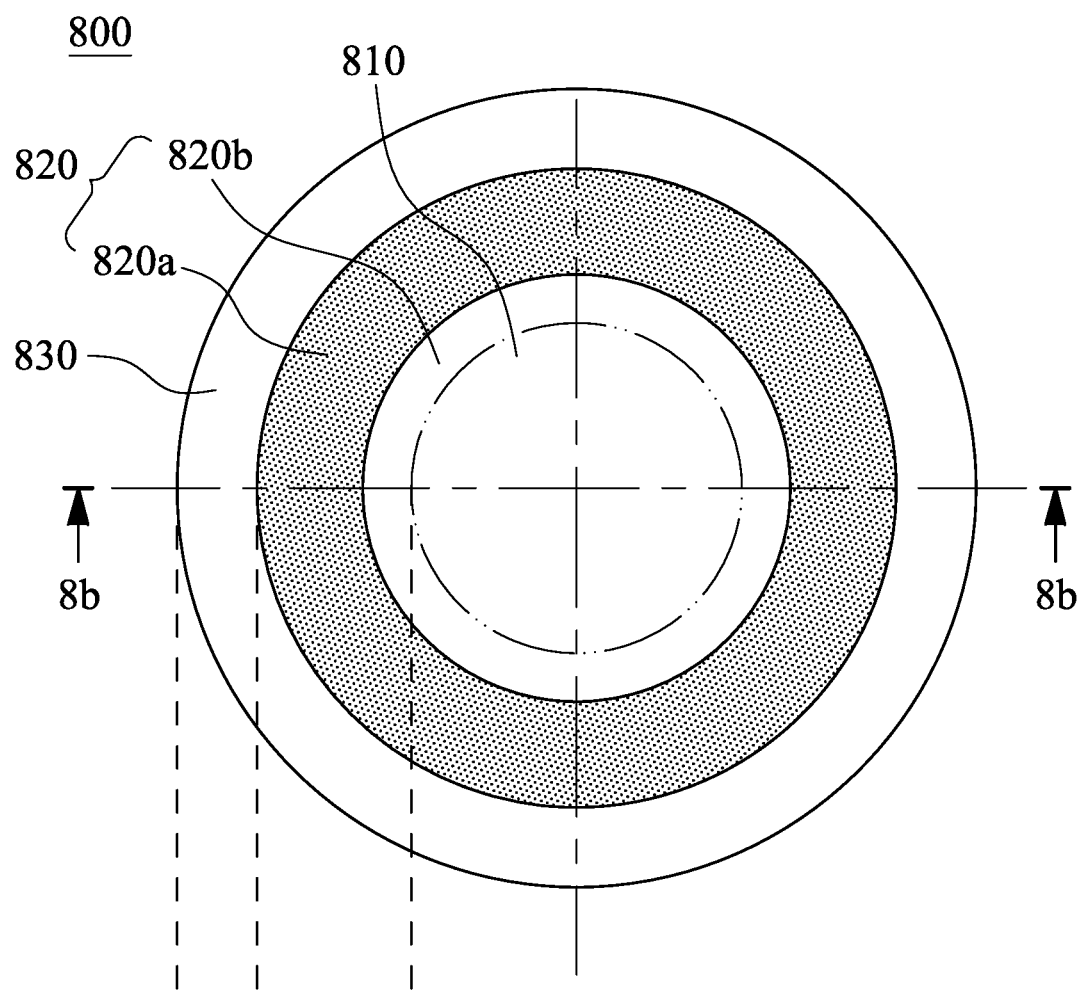
FIG. 8A is a schematic view of a contact lens according to the 5th example of the present disclosure.
Figure 8B:
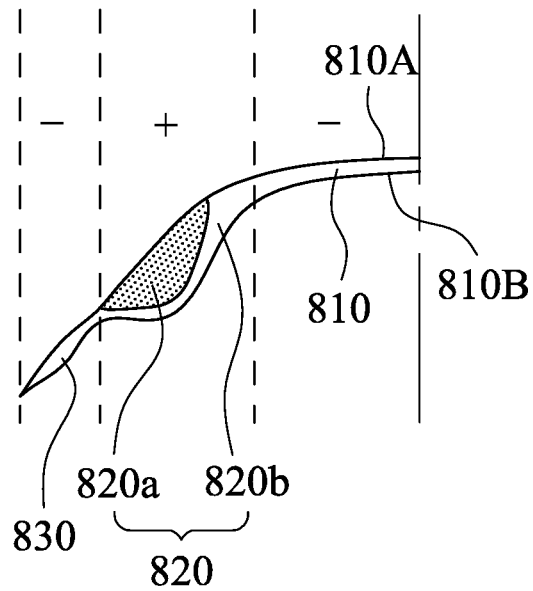
FIG. 8B is a partial cross-sectional view taken along line 8b-8b of the contact lens shown in FIG. 8A.

FIG. 8A is a schematic view of a contact lens 800 according to the 5th example of the present disclosure. FIG. 8B is a partial cross-sectional view taken along line 8b-8b of the contact lens 800 shown in FIG. 8A. In FIG. 8A and FIG. 8B, the contact lens 800 includes, in order from a center of the to a periphery, an optical zone 810, a first structural zone 820 and a second structural zone 830. The optical zone 810 provides a negative force, the first structural zone 820 provides a positive force and the second structural zone 830 provides a negative force.

The optical zone 810 includes a front surface 810A and a back surface 810B, wherein the front surface 810A is opposite to the back surface 810B, and at least one of the front surface 810A and the back surface 810B is aspheric.

The contact lens 800 includes a first material and a second material. Specifically, the first structural zone 820 which provides the positive force includes the first material and the second material. More specifically, a first portion 820a of the first structural zone 820 is made of the first material, and a second portion 820b of the first structural zone 820 is made of the second material. Moreover, the optical zone 810 and the second structural zone 830 are also made of the second material. In the example, the first material is a continuous-ring type (i.e., the first portion 820a forms a complete ring). The composition for manufacturing the contact lens 800 can be the same as previously described, and will not be repeated herein. Specifically, the contact lens 800 can, but is not limited to, be manufactured according to any two of the 1st formulation example to the 32nd formulation example.

For improving the ability for controlling the positive force and the negative force, the Young's moduli of the first material and the second material are different and can be selected according practical demands. In general, a material with a greater Young's modulus can provide a stronger positive force. Therefore, a material with a greater Young's modulus is disposed in the first structural zone 820 which provides the positive force, and the material with a smaller Young's modulus is disposed in the optical zone 810 and the second structural zone 830 which provide the negative force. That is, in the 5th example, the first material can be manufactured according to a formulation example with a greater Young's modulus, and the second material be can be manufactured according to another formulation example with a smaller Young's modulus. For example, when the first material and the second material of the contact lens 800 are both made of hydrogel, the first material can be manufactured according to one of the 9th formulation example to the 16th formulation example, and the second material can be manufactured according to one of the 1st formulation example to the 8th formulation example. For further example, when the first material and the second material of the contact lens 800 are both made of silicone hydrogel, the first material can be manufactured according to one of the 25th formulation example to the 32nd formulation example, and the second material can be manufactured according to one of the 17th formulation example to the 24th formulation example. Moreover, the first material and the second material can freely be selected from hydrogel or silicone hydrogel.

6th Example

Figure 9A:
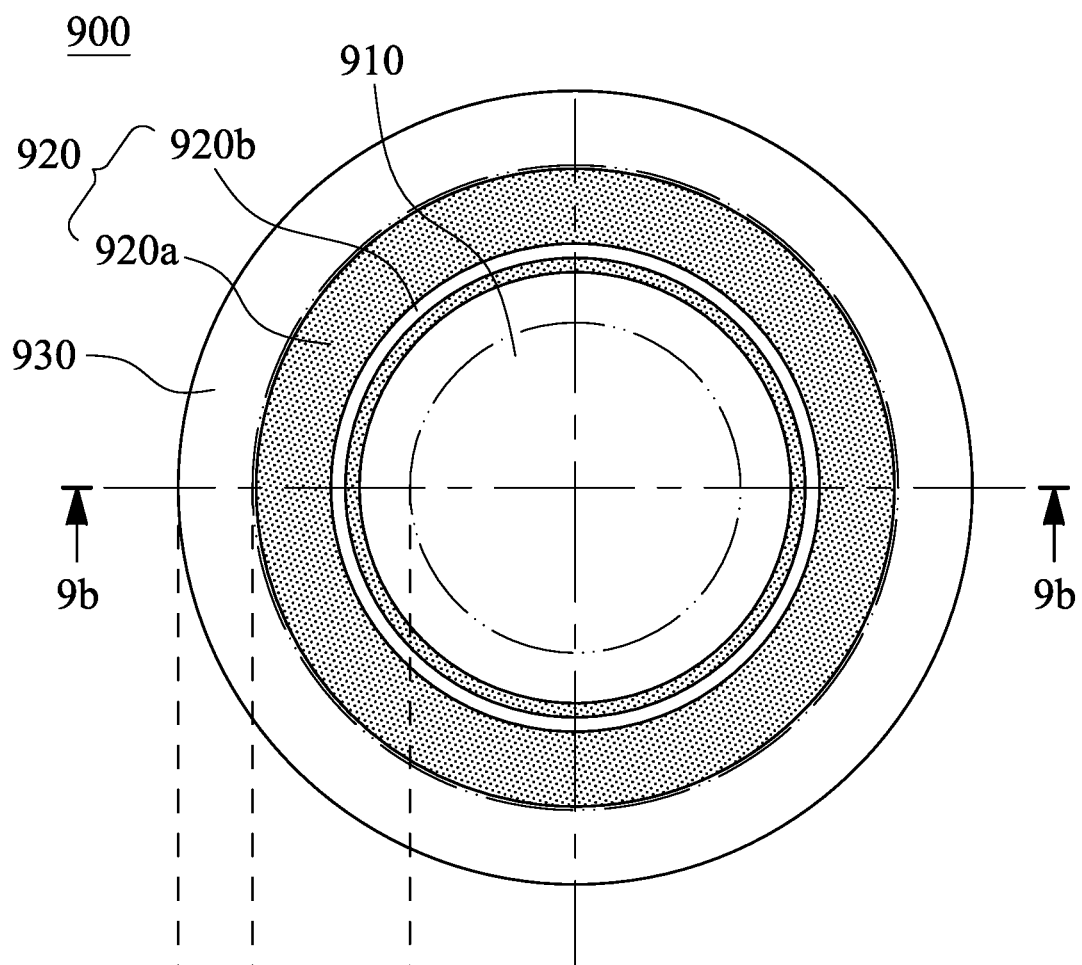
FIG. 9A is a schematic view of a contact lens according to the 6th example of the present disclosure.
Figure 9B:
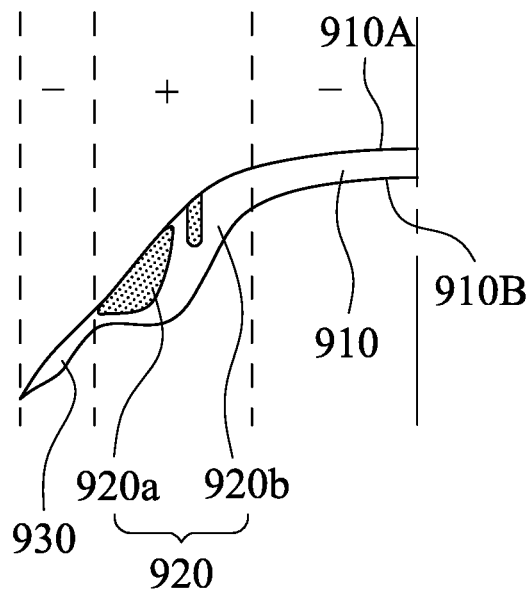
FIG. 9B is a partial cross-sectional view taken along line 9b-9b of the contact lens shown in FIG. 9A.

FIG. 9A is a schematic view of a contact lens 900 according to the 6th example of the present disclosure. FIG. 9B is a partial cross-sectional view taken along line 9b-9b of the contact lens 900 shown in FIG. 9A. In FIG. 9A and FIG. 9B, the contact lens 900 includes, in order from a center of the to a periphery, an optical zone 910, a first structural zone 920 and a second structural zone 930. The optical zone 910 provides a negative force, the first structural zone 920 provides a positive force and the second structural zone 930 provides a negative force.

The optical zone 910 includes a front surface 910A and a back surface 910B, wherein the front surface 910A is opposite to the back surface 910B, and at least one of the front surface 910A and the back surface 910B is aspheric.

The contact lens 900 includes a first material and a second material. Specifically, the first structural zone 920 which provides the positive force includes the first material and the second material. More specifically, the first structural zone 920 includes two first portions 920a and one second portion 920b, wherein the first portions 920a of the first structural zone 920 are made of the first material, and the second portion 920b of the first structural zone 920 is made of the second material. Moreover, the optical zone 910 and the second structural zone 930 are also made of the second material. In the 6th example, the first material is a multiple-ring type (i.e., each of the first portions 920a forms a complete ring). The composition for manufacturing the contact lens 900 can be the same as previously described, and will not be repeated herein. Specifically, the contact lens 900 can, but is not limited to, be manufactured according to any two of the 1st formulation example to the 32nd formulation example. For enhancing the positive force provided by the first structural zone 920, the first material can be manufactured according to a formulation example with a greater Young's modulus, and the second material be can be manufactured according to another formulation example with a smaller Young's modulus. The details of the first material and the second material can be the same as that of the 5th example, and will not be repeated herein.

7th Example

FIG. 10A is a schematic view of a contact lens 1000 according to the 7th example of the present disclosure. FIG. 10B is a partial cross-sectional view taken along line 10b-10b of the contact lens 1000 shown in FIG. 10A. In FIG. 10A and FIG. 10B, the contact lens 1000 includes, in order from a center of the to a periphery, an optical zone 1010, a first structural zone 1020 and a second structural zone 1030. The optical zone 1010 provides a positive force, the first structural zone 1020 provides a negative force and the second structural zone 1030 provides a positive force.

The optical zone 1010 includes a front surface 1010A and a back surface 1010B, wherein the front surface 1010A is opposite to the back surface 1010B, and at least one of the front surface 1010A and the back surface 1010B is aspheric.

The contact lens 1000 includes a first material and a second material. Specifically, the optical zone 1010 and the second structural zone 1030 which provide the positive force include the first material and the second material. More specifically, the optical zone 1010 includes a first portion 1010a and a second portion 1010b, the second structural zone 1030 includes a first portion 1030a and a second portion 1030b, wherein the first portion 1010a of the optical zone 1010 and the first portion 1030a of the second structural zone 1030 are made of the first material, and the second portion 1010b of the optical zone 1010 and the second portion 1030b of the second structural zone 1030 are made of the second material. Moreover, the first structural zone 1020 is also made of the second material. In the 7th example, the first material is a multiple-ring type (i.e., the first portion 1010a forms a circle and the first portion 1030a forms a complete ring). The composition for manufacturing the contact lens 1000 can be the same as previously described, and will not be repeated herein. Specifically, the contact lens 1000 can, but is not limited to, be manufactured according to any two of the 1st formulation example to the 32nd formulation example. For enhancing the positive forces provided by the optical zone 1010 and the second structural zone 1030, the first material can be manufactured according to a formulation example with a greater Young's modulus, and the second material be can be manufactured according to another formulation example with a smaller Young's modulus. The details of the first material and the second material can be the same as that of the 5th example, and will not be repeated herein.

8th Example

FIG. 11A is a schematic view of a contact lens 1100 according to the 8th example of the present disclosure. FIG. 11B is a partial cross-sectional view taken along line 11b-11b of the contact lens 1100 shown in FIG. 11A. In FIG. 11A and FIG. 11B, the contact lens 1100 includes, in order from a center of the to a periphery, an optical zone 1110, a first structural zone 1120 and a second structural zone 1130. The optical zone 1110 provides a positive force, the first structural zone 1120 provides a negative force and the second structural zone 1130 provides a positive force.

The optical zone 1110 includes a front surface 1110A and a back surface 1110B, wherein the front surface 1110A is opposite to the back surface 1110B, and at least one of the front surface 1110A and the back surface 1110B is aspheric.

The contact lens 1100 includes a first material and a second material. Specifically, the optical zone 1110 and the second structural zone 1130 which provide the positive force include the first material and the second material. More specifically, the optical zone 1110 includes two first portions 1110a and a second portion 1110b, the second structural zone 1130 includes three first portions 1130a and a second portion 1130b, wherein the first portions 1110a of the optical zone 1110 and the first portions 1130a of the second structural zone 1130 are made of the first material, and the second portion 1110b of the optical zone 1110 and the second portion 1130b of the second structural zone 1130 are made of the second material. Moreover, the first structural zone 1120 is also made of the second material. In the 8th example, the first material is a multiple-ring type (i.e., one of the first portions 1110a forms a circle, and the other of the first portions 1110a forms a complete ring) and a discontinuous-ring type (i.e., the three first portions 1130a form a discontinuous ring). When the contact lens 1100 is design for correcting astigmatism, the contact lens 1100 can achieve to a dynamic balance via the arrangement of the different materials, so that the position of the astigmatic axis can be maintained and the accuracy of correction can be enhanced. The composition for manufacturing the contact lens 1100 can be the same as previously described, and will not be repeated herein. Specifically, the contact lens 1100 can, but is not limited to, be manufactured according to any two of the 1st formulation example to the 32nd formulation example. For enhancing the positive forces provided by the optical zone 1110 and the second structural zone 1130, the first material can be manufactured according to a formulation example with a greater Young's modulus, and the second material be can be manufactured according to another formulation example with a smaller Young's modulus. The details of the first material and the second material can be the same as that of the 5th example, and will not be repeated herein.

In the aforementioned embodiments and examples, the front surface is a surface of the contact lens which is away from the eyeball when wearing, and the back surface is a surface of the contact lens which attaches to the cornea of the eyeball when wearing.

In the aforementioned embodiments and examples, the contact lens can be monofocal or multifocal. The contact lens can be featured with the multifocal property by designing the front surface and the back surface being aspheric and/or disposing at least one optical annular region thereon.

In the aforementioned embodiments and examples, when the contact lens is applied to correct myopia, the optical zone provides the positive force, and the two structural zones from the center to the periphery sequentially provide the negative force and the positive force.

In the aforementioned embodiments and examples, when the contact lens is applied to correct hyperopia, the optical zone provides the negative force, and the two structural zones from the center to the periphery sequentially provide the positive force and the negative force.

In the aforementioned embodiments and examples, when the contact lens is applied to correct astigmatism, the contact lens can be customized designed according to corneal distortion of the patient. The structural zone and the optical zone can be concentric, and the shapes of the structural zone and the optical zone can be perfect circular, oval or polygonal.

In the aforementioned embodiments and examples, the negative force is a pulling force away from the eyeball, which is generated when wearing the contact lens. The positive force is a pushing force toward to the eyeball, which is generated when wearing the contact lens. An average thickness of the zone providing the negative force (the optical zone or the structural zone) is smaller than an average thickness of the zone providing the positive force (the optical zone or the structural zone).

In the aforementioned embodiments and examples, the Young's modulus, also called elastic modulus, can represent the stiffness of a material. In general, a stiffness material has a greater Young's modulus. That is, there is larger bonding force between atoms, so that the material tends to maintain the shape and dimensions within the bearable range of the elasticity.

In the aforementioned embodiments and examples, the composition for manufacturing the contact lens can be cured by light or heat so as to form the first material and the second material. The species and content of the ingredients of the composition can be adjusted so as to manufacture the first material and the second material with different Young's modulus, so that the ability for controlling the positive force and the negative force can be improved. When the Young's modulus is greater, a higher stiffness can be provided so as to provide a stronger positive force. Therefore, the first material is suitable for being arranged in the region where providing the positive force, which is favorable to increase the pressure for eyeball. Furthermore, the distribution of the first material in the contact lens can be continuous-ring type, discontinuous-ring type or multiple-ring type. When the distribution of the first material is discontinuous-ring type, the contact lens can provide an effect of dynamic balance via the arrangement of the different materials, which is favorable for stabilizing the direction when correcting the astigmatism. Moreover, the thickness and the width of the distribution region of the first material can be optimized and adjusted according to the design. When the Young's modulus is smaller, it is favorable for increasing the extensibility, which can prevent the contact lens from being broken or damaged during the manufacturing process. Accordingly, the second material with a smaller Young's modulus is suitable for being arranged in the thinner region of the contact lens.

In the aforementioned embodiments and examples, when wearing the contact lens according to the present disclosure, an extra pressure for shaping the cornea can be provided through each closure of the eyelid when blinking, so that a better effect for shaping the cornea can be provided. Research shows that a normal person blinks 10 times to 15 times per minutes. That is, when wearing the contact lens according to the present disclosure for 6 hours each day, 3600 times to 5400 times closures of the eyelid can occur, and the effect for shaping the cornea can be provided thereby.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A contact lens comprising, in order from a center to a periphery:
   an optical zone, comprising:
   a front surface; and
   a back surface, wherein at least one of the front surface and the back surface is aspheric;
   wherein the optical zone provides a positive force or a negative force; and
   at least two structural zones surrounding the optical zone, wherein one of the structural zones provides a positive force;
   wherein a composition for manufacturing the contact lens comprises at least two kinds of monomers, at least one kind of crosslinking agent, at least one kind of diluent and at least one kind of initiator;
   wherein a maximum thickness of the structural zone providing the positive force is CTP, when the structural zone provides the negative force, a minimum thickness of the structural zone providing the negative force is CTN, when the optical zone provides the positive force, a maximum thickness of the optical zone providing the positive force is CTP1, when the optical zone provides the negative force, a minimum thickness of the optical zone providing the negative force is CTN1, and at least one of the following conditions is satisfied:
   1.0 mm/mm<CTP/CTN<2.15 mm/mm;
   1.05 mm/mm<CTP1/CTN<50 mm/mm; and
   4.0 mm/mm<CTP/CTN1<50 mm/mm.

2. The contact lens of claim 1, wherein the monomer is 2-hydroxyethyl methacrylate, glycerol monomethacrylate, methacrylic acid, 3-methacryloyloxypropyltris(trimethylsilyloxy)silane, N-vinyl-2-pyrrolidinone, N,N-dimethyl acrylamide, 3-(3-methacryloxy-2-hydroxypropoxy)propylbis(trimethylsiloxy)methylsilane or (3-acryloxy-2-hydroxypropoxypropyl)terminated polydimethylsiloxane.

3. The contact lens of claim 2, wherein the contact lens is made of hydrogel, and the monomer is the 2-hydroxyethyl methacrylate, the glycerol monomethacrylate or the methacrylic acid; and
   wherein based on 100 parts by weight of the composition, a content of the 2-hydroxyethyl methacrylate is 10 parts by weight to 96 parts by weight, a content of the glycerol monomethacrylate is 5 parts by weight to 60 parts by weight, and a content of the methacrylic acid is 0.01 parts by weight to 5 parts by weight.

4. The contact lens of claim 3, wherein based on 100 parts by weight of the composition, the content of the 2-hydroxyethyl methacrylate is 40 parts by weight to 96 parts by weight, the content of the glycerol monomethacrylate is 20 parts by weight to 50 parts by weight, and the content of the methacrylic acid is 0.1 parts by weight to 2 parts by weight.

5. The contact lens of claim 2, wherein the contact lens is made of silicone hydrogel, and the monomer is the 3-methacryloyloxypropyltris(trimethylsilyloxy)silane, the N-vinyl-2-pyrrolidinone, the N,N-dimethyl acrylamide, the 2-hydroxyethyl methacrylate, the 3-(3-methacryloxy-2-hydroxypropoxy)propylbis(trimethylsiloxy)methylsilane, the (3-acryloxy-2-hydroxypropoxypropyl)terminated polydimethylsiloxane or the methacrylic acid; and wherein based on 100 parts by weight of the composition, a content of the 3-methacryloyloxypropyltris(trimethylsilyloxy)silane is 0.1 parts by weight to 40 parts by weight, a content of the N-vinyl-2-pyrrolidinone is 0.1 parts by weight to 35 parts by weight, a content of the N,N-dimethyl acrylamide is 0.1 parts by weight to 40 parts by weight, a content of the 2-hydroxyethyl methacrylate is 0.05 parts by weight to 25 parts by weight, a content of the 3-(3-methacryloxy-2-hydroxypropoxy)propylbis(trimethylsiloxy)methylsilane is 0.1 parts by weight to 30 parts by weight, a content of the (3-acryloxy-2-hydroxypropoxypropyl)terminated polydimethylsiloxane is 0.1 parts by weight to 40 parts by weight, and a content of the methacrylic acid is 0.01 parts by weight to 5 parts by weight.

6. The contact lens of claim 5, wherein based on 100 parts by weight of the composition, the content of the 3-methacryloyloxypropyltris(trimethylsilyloxy)silane is 1 parts by weight to 40 parts by weight, the content of the N-vinyl-2-pyrrolidinone is 1 parts by weight to 35 parts by weight, the content of the N,N-dimethyl acrylamide is 1 parts by weight to 20 parts by weight, the content of the 2-hydroxyethyl methacrylate is 0.1 parts by weight to 10 parts by weight, the content of the 3-(3-methacryloxy-2-hydroxypropoxy)propylbis(trimethylsiloxy)methylsilane is 1 parts by weight to 30 parts by weight, the content of the (3-acryloxy-2-hydroxypropoxypropyl)terminated polydimethylsiloxane is 1 parts by weight to 40 parts by weight, and the content of the methacrylic acid is 0.1 parts by weight to 2 parts by weight.

7. The contact lens of claim 1, wherein the diluent is polyethylene glycol 300, polyethylene glycol 600, polyethylene glycol 800, polyethylene glycol 1000, polyethylene glycol 2000, polyethylene glycol 4000, 1,4-butanediol, ethanol, isopropyl alcohol, glycerol or 1-hexanol.

8. The contact lens of claim 1, wherein the composition further comprises an ultraviolet blocking agent or a blue-light blocking agent.

9. The contact lens of claim 1, wherein the contact lens is manufactured by a cast molding method or a spin casting method.

10. The contact lens of claim 1, wherein the optical zone comprises:

an optical central region; and
at least one optical annular region surrounding the optical central region, wherein a diopter of the optical central region is different from a diopter of the optical annular region.

11. The contact lens of claim 10, wherein the diopter of the optical central region is PowC, the optical annular region closest to the periphery of the contact lens is a first optical annular region, a maximum diopter of the first optical annular region is PowP1, and the following condition is satisfied:

|PowC−PowP|<5 D.

12. The contact lens of claim 1, wherein the composition for manufacturing the contact lens comprises at least four kinds of monomers, at least two kinds of crosslinking agents, at least two kinds of diluents and at least one kind of initiator.

13. The contact lens of claim 12, wherein the monomer is 2-hydroxyethyl methacrylate, glycerol monomethacrylate, methacrylic acid, 3-methacryloyloxypropyltris(trimethylsilyloxy)silane, N-vinyl-2-pyrrolidinone, N,N-dimethyl acrylamide, 3-(3-methacryloxy-2-hydroxypropoxy)propylbis(trimethylsiloxy)methylsilane or (3-acryloxy-2-hydroxypropoxypropyl)terminated polydimethylsiloxane.

14. The contact lens of claim 12, wherein the contact lens comprises a first material and a second material, a Young's modulus of the first material is HMPa, a Young's modulus of the second material is LMPa, and the following condition is satisfied:

HMPa/LMPa>1.3.

15. The contact lens of claim 12, wherein the contact lens comprises a first material and a second material, a Young's modulus of the first material is HMPa, a Young's modulus of the second material is LMPa, and the following condition is satisfied:

HMPa/LMPa>1.5.

16. The contact lens of claim 12, wherein when the structural zone or the optical zone provides the positive force, the structural zone providing the positive force or the optical zone providing the positive force comprises a first material and a second material.

17. The contact lens of claim 12, wherein when the structural zone provides the positive force, a maximum thickness of the structural zone providing the positive force is CTP, when the structural zone provides the negative force, a minimum thickness of the structural zone providing the negative force is CTN, when the optical zone provides the positive force, a maximum thickness of the optical zone providing the positive force is CTP1, when the optical zone provides the negative force, a minimum thickness of the optical zone providing the negative force is CTN1, and at least one of the following conditions is satisfied:

1.0 mm/mm<CTP/CTN<50 mm/mm;
1.0 mm/mm<CTP1/CTN<50 mm/mm; and
1.0 mm/mm<CTP/CTN1<50 mm/mm.

18. A contact lens comprising, in order from a center to a periphery:

an optical zone, comprising:
a front surface; and
a back surface, wherein at least one of the front surface and the back surface is aspheric;
wherein the optical zone provides a positive force or a negative force; and
at least two structural zones surrounding the optical zone, wherein one of the structural zones provides a positive force;
wherein a composition for manufacturing the contact lens comprises at least two kinds of monomers, at least one kind of crosslinking agent, at least one kind of diluent and at least one kind of initiator;
wherein a maximum thickness of the structural zone providing the positive force is CTP, when the structural zone provides the negative force, a minimum thickness of the structural zone providing the negative force is CTN, when the optical zone provides the positive force, a maximum thickness of the optical zone providing the positive force is CTP1, when the optical zone provides the negative force, a minimum thickness of the optical zone providing the negative force is CTN1, and at least one of the following conditions is satisfied:
2.3 mm/mm<CTP/CTN<50 mm/mm;
1.05 mm/mm<CTP1/CTN<50 mm/mm; and
4.0 mm/mm<CTP/CTN1<50 mm/mm.

* * * * *